(12) United States Patent
Shimizu et al.

(10) Patent No.: US 8,790,014 B2
(45) Date of Patent: Jul. 29, 2014

(54) BEARING DEVICE FOR AXLE OF RAILWAY VEHICLE

(75) Inventors: Yasuhiko Shimizu, Kuwana (JP);
Yasuhiro Shimizu, Kuwana (JP);
Fumihiro Murakami, Kuwana (JP);
Masahiko Kataoka, Kuwana (JP);
Masanori Ueno, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/635,939

(22) PCT Filed: Mar. 24, 2011

(86) PCT No.: PCT/JP2011/057108
§ 371 (c)(1),
(2), (4) Date: Sep. 19, 2012

(87) PCT Pub. No.: WO2011/125508
PCT Pub. Date: Oct. 13, 2011

(65) Prior Publication Data
US 2013/0011090 A1 Jan. 10, 2013

(30) Foreign Application Priority Data

Apr. 8, 2010 (JP) ................................. 2010-089484
Jun. 10, 2010 (JP) ................................. 2010-133210

(51) Int. Cl.
*F16C 33/80* (2006.01)
*B61F 15/12* (2006.01)

(52) U.S. Cl.
USPC .......................... 384/480; 384/459; 277/412

(58) Field of Classification Search
CPC .... F16C 33/80; F16C 19/385; F16C 2326/10; B61F 15/22; B61F 15/26
USPC .......................... 384/480, 477, 484, 571, 459; 277/417–420, 410–412
See application file for complete search history.

(56) References Cited

U.S. PATENT DOCUMENTS 3,259,442 A * 7/1966 Boghosian .................... 384/480
3,628,837 A   12/1971 Otto
(Continued)

FOREIGN PATENT DOCUMENTS

| JP | 2003-336651 | 11/2003 |
| JP | 2004-500518 | 1/2004 |

(Continued)

OTHER PUBLICATIONS

International Search Report issued Jun. 7, 2011 in International (PCT) Application No. PCT/JP2011/057108.

(Continued)

*Primary Examiner* — James Pilkington
(74) *Attorney, Agent, or Firm* — Wenderoth, Lind & Ponack, L.L.P.

(57) ABSTRACT

An axle bearing device includes an inner ring fixed to an axle of a railway vehicle, an outer ring fixed to a journal box of the railway vehicle, and double row tapered rollers arranged between raceway surfaces of the inner ring and raceway surfaces of the outer ring. An opening portion between the inner ring and the outer ring is sealed by a labyrinth seal including at least one axial labyrinth extending in an axial direction and at least one radial labyrinth extending in a radial direction. At least one of the at least one axial labyrinth and the at least one radial labyrinth which form the labyrinth seal is formed between an outer-ring-side sealing member mounted to the outer ring and the inner ring or between the outer-ring-side sealing member mounted to the outer ring and an inner-ring-side sealing member mounted to the inner ring.

13 Claims, 16 Drawing Sheets

(56) References Cited

U.S. PATENT DOCUMENTS

| | | | |
|---|---|---|---|
| 4,093,324 A * | 6/1978 | Carrigan | 384/480 |
| 4,379,600 A * | 4/1983 | Muller | 384/480 |
| 4,438,990 A * | 3/1984 | Schalk et al. | 384/480 |
| 4,972,939 A * | 11/1990 | Uttke et al. | 198/501 |
| 5,028,054 A * | 7/1991 | Peach | 277/348 |
| 5,383,549 A * | 1/1995 | Mayer | 198/842 |
| 5,655,845 A * | 8/1997 | Lampart | 384/480 |
| 5,975,533 A | 11/1999 | Hubbard et al. | |
| 6,179,472 B1 * | 1/2001 | Gilliland et al. | 384/477 |
| 6,561,559 B1 | 5/2003 | Skiller et al. | |
| 6,845,986 B2 * | 1/2005 | Hood et al. | 277/409 |
| 7,607,836 B2 * | 10/2009 | Mason et al. | 384/480 |
| 2003/0201609 A1 * | 10/2003 | Hood et al. | 277/409 |
| 2008/0190743 A1 * | 8/2008 | Hong | 198/835 |
| 2009/0127795 A1 * | 5/2009 | Lattime et al. | 277/412 |

FOREIGN PATENT DOCUMENTS

| | | |
|---|---|---|
| JP | 2005-325866 | 11/2005 |
| JP | 2006-010042 | 1/2006 |
| JP | 2007-078113 | 3/2007 |
| JP | 2007-255599 | 10/2007 |
| JP | 2009-052681 | 3/2009 |
| JP | 2009-138879 | 6/2009 |

OTHER PUBLICATIONS

International Preliminary Report on Patentability and Written Opinion of the International Searching Authority issued Nov. 15, 2012 in International (PCT) Application No. PCT/JP2011/057108.

Office Action dated Sep. 18, 2013 in corresponding Japanese Application No. 2010-089484, with partial English translation.

* cited by examiner

BEARING DEVICE FOR AXLE OF RAILWAY VEHICLE

TECHNICAL FIELD

The present invention relates to an axle bearing device for a railway vehicle.

BACKGROUND ART

FIG. 26 illustrates a publicly-known axle bearing device for a railway vehicle. An axle bearing device 200 illustrated in FIG. 26 includes: a roller bearing 210; a front lid 202 and a rear lid 203 provided respectively on both sides in an axial direction of the roller bearing 210 while sandwiching therebetween inner rings 211 of the roller bearing 210 in the axial direction; and sealing devices 220 and 220 arranged respectively at opening portions at one end and another end of the roller bearing 210. The roller bearing 210 is what is called a double row tapered roller bearing, and includes the inner rings 211 fixed to an axle 201 of a railway vehicle, an outer ring 212 fixed to a journal box (not shown) of the railway vehicle, tapered rollers 213 as rolling elements arranged in double rows between raceway surfaces of the inner rings 211 and the outer ring 212, and retainers 214 for retaining the tapered rollers 213 at predetermined intervals in a circumferential direction.

The sealing device 220 arranged on a proximal end side of the axle 201 includes an outer-ring-side sealing member formed of a sealing case 221 fixed to an inner periphery of an end portion of the outer ring 212 and a sealing member 222 fixed to an inner periphery of the sealing case 221, and the rear lid 203. Specifically, as illustrated in an enlarged part in FIG. 26, an opening portion between the inner ring 211 and the outer ring 212 is sealed by a contact seal formed by bringing sealing lips 222a and 222b provided at an inner diameter end portion of the sealing member 222 into contact with an outer surface of the rear lid 203, and a non-contact seal (labyrinth seal) formed by fitting a leading end 221a of the sealing case 221 to an annular groove 203a provided in an end surface of the rear lid 203 across a gap. The sealing device 220 arranged on a leading end side of the axle 201 has substantially the same structure. With this, leakage of lubricant such as grease filling an inner space of the roller bearing 210 (annular space formed between the inner ring 211 and the outer ring 212) to an outside, and intrusion of foreign matter such as dust into a bearing inner space are prevented as much as possible (for details, refer, for example, to Patent Literatures 1 and 2).

CITATION LIST

Patent Literature 1: JP 2003-336651 A
Patent Literature 2: JP 2007-255599 A

SUMMARY OF INVENTION

Technical Problems

The sealing device having the contact seal structure as described above is suitable to enhance sealability of the roller bearing. However, the contact seal has a sealing structure to be slid against a mating member (lid member in the example illustrated in FIG. 26), and hence there is a problem that an unnatural increase in bearing temperature and an increase in bearing torque are liable to occur. Such problems become evident along with an increase in rotational speed of an axle. In recent years, many railway companies have planned to offer higher speed service. Under the circumstances, there has been a demand to secure high sealing performance while solving the problems such as the unnatural increase in bearing temperature and the increase in bearing torque.

The present invention has been made in view of such circumstances, and it is therefore an object of the present invention to secure, in an axle bearing device for a railway vehicle, high sealing performance while achieving torque reduction and suppression of heat generation.

Solution to Problems

In order to attain the object described above, according to the present invention, there is provided an axle bearing device for a railway vehicle, comprising: an inner ring fixed to an axle of the railway vehicle; an outer ring fixed to a journal box of the railway vehicle; and double row rolling elements arranged between raceway surfaces of the inner ring and raceway surfaces of the outer ring, wherein an opening portion between the inner ring and the outer ring is sealed by a labyrinth seal comprising at least one axial labyrinth and at least one radial labyrinth, and wherein at least one of the at least one axial labyrinth and the at least one radial labyrinth which form the labyrinth seal is formed between an outer-ring-side sealing member mounted to the outer ring and the inner ring or between the outer-ring-side sealing member mounted to the outer ring and an inner-ring-side sealing member mounted to the inner ring. Note that, in the present invention, the "axial labyrinth" means a gap extending in an axial direction, and the "radial labyrinth" means a gap extending in a radial direction. The same applies to a "first axial labyrinth," a "first radial labyrinth," and the like described hereinbelow.

As described above, in the axle bearing device for a railway vehicle according to the present invention, the opening portion between the inner ring and the outer ring is sealed by the labyrinth seal as a non-contact seal, the labyrinth seal having a bent form comprising the at least one axial labyrinth and the at least one radial labyrinth. Thus, while securing sealing performance higher than that in a conventional sealing structure in which a contact seal and the non-contact seal are used in combination with each other to seal the opening portion between the inner ring and the outer ring, torque reduction and suppression of heat generation can be achieved.

Further, sealing performance of the labyrinth seal depends on width accuracies of the labyrinths (gaps) forming the labyrinth seal. However, for example, when all the labyrinths forming the labyrinth seal are formed between the outer-ring-side sealing member mounted to the outer ring and members provided separately from the roller bearing (for example, lid member), it is difficult to enhance the width accuracies of the labyrinths. Meanwhile, in the present invention, the at least one of the at least one axial labyrinth and the at least one radial labyrinth which form the labyrinth seal is formed between the outer-ring-side sealing member mounted to the outer ring and the inner ring or between the outer-ring-side sealing member mounted to the outer ring and the inner-ring-side sealing member mounted to the inner ring. Thus, a width accuracy of at least a part of the labyrinth seal can be easily enhanced, with the result that high sealing performance can be secured.

In the structure described above, the labyrinth seal may comprise at least a first axial labyrinth, a first radial labyrinth, and a second axial labyrinth which are provided continuously with each other in the stated order from a bearing internal side toward a bearing external side, the second axial labyrinth being arranged on an outer diameter side with respect to the first axial labyrinth, the first axial labyrinth being formed between the outer-ring-side sealing member mounted to the outer ring and an extended portion which is provided integrally with the inner ring and extends in an axial direction. Note that, the "bearing internal side" and the "bearing external side" herein respectively means sides relatively opposite to and near an open-to-air portion of the labyrinth seal.

With such a structure, even when foreign matter intrudes into the labyrinth seal, the intruding foreign matter is forced back into the second axial labyrinth on the bearing external side by a centrifugal force to act into the first radial labyrinth in accordance with rotation of the axle. Therefore, the foreign matter is less liable to reach the first axial labyrinth positioned on the bearing internal side. As a result, intrusion of foreign matter into the bearing inner space is prevented as much as possible. Further, the first axial labyrinth is formed between the outer-ring-side sealing member mounted to the outer ring and the extended portion provided integrally with the inner ring. Thus, a width accuracy of at least the first axial labyrinth can be easily enhanced, and in addition, an axial dimension of the first axial labyrinth can be sufficiently secured. Therefore, high sealing performance can be stably secured while torque reduction and suppression of heat generation of the axle bearing device are achieved.

The labyrinth seal may further comprise a second radial labyrinth extending from an end portion on the bearing external side of the second axial labyrinth to the outer diameter side. With such a structure, during rotation of the axle, intrusion of foreign matter into the labyrinth seal is effectively prevented by the centrifugal force to act into the second radial labyrinth in accordance with rotation of the axle. Further, even when foreign matter intrudes into the labyrinth seal (second radial labyrinth), the above-mentioned centrifugal force causes the foreign matter to be forced back to the outside of the bearing. Thus, sealing performance can be further enhanced.

An annular protrusion for partially reducing a clearance of the first axial labyrinth may be provided on at least one of two opposed surfaces forming the first axial labyrinth. In addition to this, or alternatively, an annular protrusion for partially reducing a clearance of the second axial labyrinth may be provided on at least one of two opposed surfaces forming the second axial labyrinth. With this, sealing performance of the labyrinth seal is further enhanced, and hence intrusion of foreign matter into the bearing inner space is much more effectively prevented.

In the structure described above, a branch portion having an end portion on the bearing internal side free from being communicated to the opening portion between the inner ring and the outer ring may be provided on a path of the labyrinth seal. With such a structure, at least a part of the foreign matter having intruded into the labyrinth seal can be captured by the branch portion, which is advantageous in preventing intrusion of foreign matter into the bearing inner space. For example, the second radial labyrinth extending from an end portion on the bearing external side of the second axial labyrinth to the outer diameter side may be provided, and the branch portion may be formed of an annular space extending from an inner diameter end portion of this second radial labyrinth to the inner diameter side. With this, the foreign matter captured by the branch portion is smoothly discharged to the outside of the bearing through the second radial labyrinth by the centrifugal force to act in accordance with rotation of the axle, and in addition, by its own weight.

According to the present invention, the axle bearing device for a railway vehicle may further comprise: a lid member arranged on an axial end portion side of the inner ring; and a branch portion forming member for forming the branch portion between the branch portion forming member and the lid member. The branch portion forming member may comprise: an annular portion interposed between an end surface of the inner ring and an end surface of the lid member; and a cylindrical portion extending in the axial direction from an outer diameter end portion of the annular portion along an outer surface of the lid member. Further, the lid member may be fastened to the axle through intermediation of an elastic portion made of an elastic material and interposed under a compressed state between the outer surface of the lid member and an inner surface of the cylindrical portion of the branch portion forming member. With this, the branch portion having the above-mentioned functions can be easily formed, and a fixation force of the lid member with respect to the axle can be increased. The elastic portion may be provided separately from the branch portion forming member and the lid member, or may be provided integrally with the branch portion forming member or the lid member.

The branch portion forming member may further comprise a small diameter cylindrical portion extending in the axial direction from an inner diameter end portion of the annular portion, the small diameter cylindrical portion being fitted to an inner surface of the inner ring. Note that, the branch portion forming member may be fixed by being fitted to the axle.

When the labyrinth seal further comprises a third radial labyrinth extending from an end portion on the bearing internal side of the first axial labyrinth to the outer diameter side, an effect of preventing leakage of lubricant filling the inner space of the roller bearing to the outside is enhanced. The third radial labyrinth may be formed between the outer-ring-side sealing member and the inner ring. With this, a width accuracy of the third radial labyrinth can be easily enhanced, and hence high sealing performance can be secured.

Further, the labyrinth seal may further comprise: a third axial labyrinth extending in the axial direction from an outer diameter end portion of the third radial labyrinth; and a fourth radial labyrinth extending from an end portion on the bearing internal side of the third axial labyrinth to the outer diameter side. With this, the effect of preventing leakage of the lubricant filling the bearing inner space to the outside is further enhanced. When the third axial labyrinth and the fourth radial labyrinth are formed between the outer-ring-side sealing member and a first inner-ring-side sealing member mounted to the inner ring, width accuracies of those third axial labyrinth and fourth radial labyrinth can be easily enhanced.

The first axial labyrinth, the first radial labyrinth, and the second axial labyrinth may be formed between the outer-ring-side sealing member and a second inner-ring-side sealing member mounted to the extended portion of the inner ring. Also in this case, the width accuracies of the labyrinths can be easily enhanced. Even when the above mentioned structure is employed, a branch portion having an end portion on the bearing internal side free from being communicated to the opening portion may be provided on a path of the labyrinth seal. In this case, the branch portion may be formed between a lid member arranged on an axial end portion side of the inner ring and a branch portion forming member having an outer surface held by the second inner-ring-side sealing member.

In a case where the axle bearing device comprises the lid member, the labyrinth seal may further comprise: a fourth axial labyrinth formed between the outer-ring-side sealing member and the lid member and extending in the axial direction from an outer diameter end portion of the second radial labyrinth; and a fifth radial labyrinth extending from an end portion on the bearing external side of the fourth axial labyrinth to the outer diameter side.

Further, in the axle bearing device for a railway vehicle according to the present invention, the outer-ring-side sealing member may comprise a seal extended portion extending toward an end surface of the inner ring, the seal extended portion forming the labyrinth seal.

With this, on a bearing device manufacturer's side, for example, the width accuracies of the labyrinths forming the labyrinth seal can be managed, and hence sealing performance of the labyrinth seal can be enhanced. Further, the outer-ring-side sealing member comprises the seal extended portion extending toward the end surface of the inner ring, and hence the outer-ring-side sealing member is provided with a part swelling to the outside of the bearing inner space. Thus, a form of the outer-ring-side sealing member is similar to that of a conventional sealing assembly comprising a sealing member and a sealing case. As a result, replacement of such a conventional sealing assembly can be performed without changing design around the bearing device. Further, mounting and removing with respect to the outer ring are facilitated.

In the structure described above, of the at least one axial labyrinth and the at least one radial labyrinth which form the labyrinth seal, at least the at least one axial labyrinth may be formed between the seal extended portion and the inner-ring-side sealing member mounted to the inner ring. In this case, a projection-recess portion may be provided on at least one of two opposed surfaces of the seal extended portion and the inner-ring-side sealing member. Alternatively, the seal extended portion of the outer-ring-side sealing member may be provided with a recessed portion, and a leading end of the inner-ring-side sealing member may be accommodated in the recessed portion. The recessed portion of the seal extended portion can be made of an elastic material. Still alternatively, the seal extended portion may be provided with an elastic portion made of an elastic material, and, of the at least one axial labyrinth and the at least one radial labyrinth which form the labyrinth seal, at least the at least one axial labyrinth may be formed between the elastic portion and the inner-ring-side sealing member. In this case, the at least one axial labyrinth may be formed between another elastic portion made of an elastic material and provided to the inner-ring-side sealing member and the elastic portion of the seal extended portion, or may be formed between lips provided to the elastic portion of the seal extended portion and the inner-ring-side sealing member. Yet alternatively, a recessed portion may be provided in the end surface of the inner ring, and a leading end of the seal extended portion of the outer-ring-side sealing member may be accommodated in the recessed portion.

Further, in the structure described above, of the at least one axial labyrinth and the at least one radial labyrinth which form the labyrinth seal, at least the at least one radial labyrinth may be formed between the seal extended portion and the inner ring. In this case, a projection-recess portion may be provided on at least one of two opposed surfaces of the seal extended portion and the inner ring. Alternatively, both two opposed surfaces of the seal extended portion and the inner ring may be each provided with the projection-recess portion, and both the projection-recess portions may be held in an engaged state. In this case, a part or the whole of a part of the seal extended portion, which form the labyrinths together with the inner ring, may be formed of the elastic portion made of an elastic material.

Further, in the structure described above, of the at least one axial labyrinth and the at least one radial labyrinth which form the labyrinth seal, at least the at least one axial labyrinth may be formed between the seal extended portion and a separate member mounted to the axle of the railway vehicle on a shaft end side with respect to the inner ring. In this case, a projection-recess portion may be provided on at least one of two opposed surfaces of the seal extended portion and the separate member.

Advantageous Effects of Invention

As described hereinabove, according to the present invention, in the axle bearing device for a railway vehicle, high sealing performance can be secured while torque reduction and suppression of heat generation are achieved. With this, a bearing structure capable of contributing to higher speed service of railway vehicles can be provided.

DESCRIPTION OF EMBODIMENTS

In the following, description is made of embodiments of the present invention with reference to the drawings.

Figure 1:
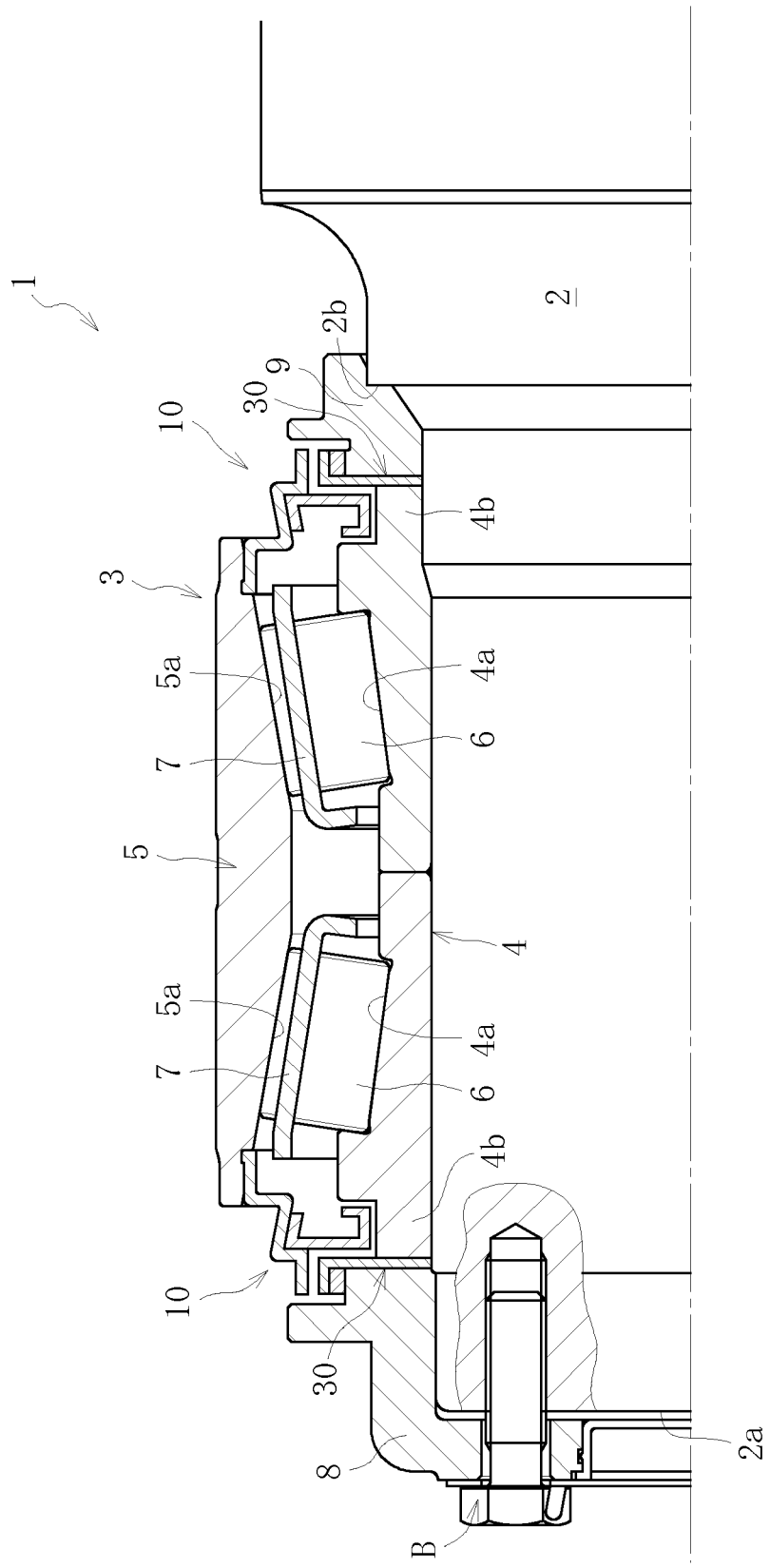
[FIG. 1] An axial sectional view of an axle bearing device according to an embodiment of the present invention.

FIG. 1 is an axial sectional view of an overall structure of an axle bearing device 1 according to an embodiment of the present invention. The axle bearing device 1 illustrated in FIG. 1 supports an axle 2 of a railway vehicle in a freely rotatable manner, and comprises, as main components, a roller bearing 3 mounted to an outer periphery of the axle 2, a pair of sealing devices 10 and 10, and lid members arranged on both sides in an axial direction of the roller bearing 3 (front lid 8 and rear lid 9).

The roller bearing 3 is what is called a double row tapered roller bearing, and comprises an inner ring 4 having double row inner raceway surfaces 4a and 4a and fixed to the outer periphery of the axle 2, and an outer ring 5 having double row outer raceway surface 5a and 5a and fixed to a journal box (not shown) of a railway vehicle, tapered rollers 6 as rolling elements arranged between the raceway surfaces 4a and 5a of the inner ring 4 and the outer ring 5, and a pair of retainers 7 and 7 for retaining the tapered rollers 6 in each row at predetermined intervals in a circumferential direction. In the illustration, the inner ring 4 is formed of a pair of divided inner rings in abutment against each other in the axial direction. Alternatively, the inner ring 4 may comprise a distance piece (spacer) interposed between the pair of divided inner rings, or may be formed of a single member.

The front lid 8 is fixed to the axle 2 with a bolt member B fastened to a leading end surface 2a of the axle 2, and the rear lid 9 is fixed to the axle 2 in a manner of being engaged in the axial direction with a shoulder surface 2b provided to the axle 2. Between the inner ring 4 and the front lid 8 and between the inner ring 4 and the rear lid 9, there are respectively arranged intermediate members 30 each having a function of a branch portion forming member. The intermediate member 30 arranged on a leading end side of the axle 2 (left side of FIG. 1) is held in close contact without gaps with end surfaces of the inner ring 4 and the front lid 8, and the intermediate member 30 arranged on a proximal end side of the axle 2 (right side of FIG. 1) is held in close contact without gaps with end surfaces of the inner ring 4 and the rear lid 9. With this structure, a relative position in the axial direction of the roller bearing 3 (inner ring 4) with respect to the axle 2 is determined, and relative movement in the axial direction of the roller bearing 3 with respect to the axle 2 is restricted. Note that, detailed description of a structure and functions of the intermediate member 30 is made below.

Figure 2:
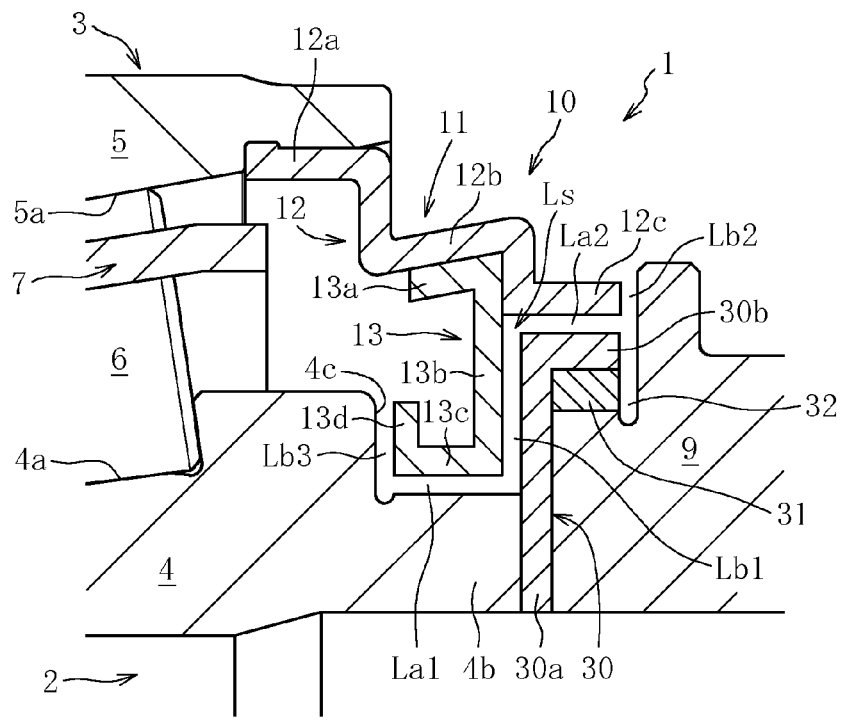
[FIG. 2] A main-part enlarged sectional view of FIG. 1.

FIG. 2 illustrates a vicinity of the sealing device 10 arranged on the proximal end side of the axle 2 on an enlarged scale. A main portion of the sealing device 10 comprises an outer-ring-side sealing member 11 mounted to the outer ring 5, the inner ring 4 mounted to the axle 2, the rear lid 9, and the intermediate member 30. A labyrinth seal Ls formed in cooperation among those members seals an opening portion at one end of the roller bearing 3. With this, leakage of lubricant such as grease filling a bearing inner space (annular space formed between the inner ring 4 and the outer ring 5) to an outside, and intrusion of foreign matter into the bearing inner space are prevented as much as possible. The labyrinth seal Ls comprises at least one axial labyrinth extending in the axial direction and at least one radial labyrinth extending in a radial direction. In this case, there are provided a first axial labyrinth La1, a first radial labyrinth Lb1, and a second axial labyrinth La2 which are provided continuously with each other in the stated order from a bearing internal side (side opposite to an open-to-air portion of the labyrinth seal Ls) toward a bearing external side (side near the open-to-air portion of the labyrinth seal Ls). Note that, in the drawings including FIGS. 1 and 2 as reference for illustration of the embodiments of the present invention, clearances of the labyrinths forming the labyrinth seal Ls are exaggerated for the sake of ease of understanding. Further, the sealing device 10 arranged on the leading end side of the axle 2 has substantially the same structure as that of the sealing device 10 arranged on the proximal end side of the axle 2, and hence detailed description thereof is omitted.

The outer-ring-side sealing member 11 comprises a first outer-ring-side sealing member 12, which is formed into a stepped cylindrical shape to integrally have a large diameter portion 12a, an intermediate diameter portion 12b, and a small diameter portion 12c and having the large diameter portion 12a fixed to an inner periphery of an end portion of the outer ring 5, and a second outer-ring-side sealing member 13 fixed to an inner periphery of the first outer-ring-side sealing member 12. The second outer-ring-side sealing member 13 integrally comprises a large diameter portion 13a fixed to an inner periphery of the intermediate diameter portion 12b of the first outer-ring-side sealing member 12, a first annular portion 13b extending from an end portion on a counter roller bearing side of the large diameter portion 13a to an inner diameter side, a small diameter portion 13c extending in the axial direction from an inner diameter end portion of the first annular portion 13b, and a second annular portion 13d extending from an end portion on the roller bearing side of the small diameter portion 13c to an outer diameter side. The first outer-ring-side sealing member 12 and the second outer-ring-side sealing member 13 are each obtained, for example, by press-molding a metal material.

Note that, the intermediate diameter portion 12b of the first outer-ring-side sealing member 12 gradually expands in diameter to a side separated from the roller bearing 3. The intermediate diameter portion 12b formed in such a form can be utilized as a hook portion of a jig to be used for removing the outer-ring-side sealing member 11 from the outer ring 5. Thus, the outer-ring-side sealing member 11 is more easily removed from the outer ring 5.

The inner ring 4 integrally comprises an extended portion 4b extended to the proximal end side of the axle 2 with respect to an end surface of the outer ring 5. With this, a capacity of the annular space to be formed between the outer-ring-side sealing member 11 mounted to the outer ring 5 and the inner ring 4 is increased, with the result that a retention capability for the lubricant can be increased.

The intermediate member 30 as a branch portion forming member is formed into an L-shape in cross-section to integrally have an annular portion 30a interposed between the end surface of the inner ring 4 (extended portion 4b) and the end surface of the rear lid 9 facing each other, and a cylindrical portion 30b extending in the axial direction from an outer diameter end portion of the annular portion 30a along an outer surface of the rear lid 9. The intermediate member 30 is made, for example, of a metal material such as brass, a copper alloy, and stainless steel. Between an inner surface of the cylindrical portion 30b of the intermediate member 30 and the outer surface of the rear lid 9 facing each other, an elastic portion 31 made of an elastic material such as a resin material and a rubber material is interposed under a compressed state. With this, the rear lid 9 is mounted to the axle 2 with higher strength. The elastic portion 31 may be provided as a separate member other than the intermediate member 30 and the rear lid 9, or may be molded together with the intermediate member 30 as an insert component.

Then, the small diameter portion 13c of the second outer-ring-side sealing member 13 is arranged close to an outer surface of the extended portion 4b of the inner ring 4. In this way, the first axial labyrinth La1 is formed. Further, the first annular portion 13b of the second outer-ring-side sealing member 13 is arranged close to the annular portion 30a of the intermediate member 30. In this way, the first radial labyrinth Lb1 having an inner diameter end portion continuous with an end portion on the bearing external side of the first axial labyrinth La1 is formed. Further, the small diameter portion 12c of the first outer-ring-side sealing member 12 is arranged close to an outer surface of the cylindrical portion 30b of the intermediate member 30. In this way, the second axial labyrinth La2 extending in the axial direction from an outer diameter end portion of the first radial labyrinth Lb1 is formed.

As described above, in the axle bearing device 1 according to the present invention, opening portions between the inner ring 4 and the outer ring 5 are sealed by the labyrinth seal Ls, that is, a non-contact seal. Thus, in the roller bearing 3, by extension, the axle bearing device 1, torque can be reduced and heat generation can be suppressed as compared to a conventional sealing structure illustrated in FIG. 26 in which the opening portions between the inner ring and the outer ring are sealed not only by contact seals but also by non-contact seals. Further, the labyrinth seal Ls is formed into a bent form to have at least one axial labyrinth and at least one radial labyrinth. Specifically, in this embodiment, the labyrinth seal Ls comprises the first axial labyrinth La1, the first radial labyrinth Lb1, and the second axial labyrinth La2 which are provided continuously with each other in the stated order from the bearing internal side to the bearing external side. The second axial labyrinth La2 is arranged on the outer diameter side with respect to the first axial labyrinth La1. Thus, even when foreign matter intrudes into the labyrinth seal Ls, the intruding foreign matter is forced back into the second axial labyrinth La2 on the bearing external side by a centrifugal force to act into the first radial labyrinth Lb1 in accordance with rotation of the axle 2. Therefore, the foreign matter is less liable to reach the first axial labyrinth La1 positioned on the bearing internal side. In this way, intrusion of foreign matter into the bearing inner space is prevented as much as possible.

Sealing performance of the labyrinth seal Ls depends on width accuracies of the labyrinths forming the labyrinth seal Ls. However, for example, when all the labyrinths forming the labyrinth seal Ls are formed between the outer-ring-side sealing member 11 mounted to the outer ring 5 and the members provided separately from the roller bearing 3 (in this case, rear lid 9 and intermediate member 30), it is difficult to enhance the width accuracies of the labyrinths, by extension, to secure desired sealing performance. Meanwhile, in the present invention, at least one of the axial labyrinth and the radial labyrinths forming the labyrinth seal Ls (in this case, the first axial labyrinth La1) is formed between the outer-ring-side sealing member 11 and the extended portion 4b provided integrally with the inner ring 4. Thus, a width accuracy of at least the first axial labyrinth La1 can be easily enhanced, and in addition, an axial dimension of the first axial labyrinth La1 can be sufficiently secured. Therefore, torque reduction and suppression of heat generation of the axle bearing device 1 of such a type can be easily achieved, and high sealing performance can be stably secured.

The labyrinth seal Ls in this embodiment further comprises a second radial labyrinth Lb2 extending from an end portion on the bearing external side of the second axial labyrinth La2 to the outer diameter side. The second radial labyrinth Lb2 is formed by arranging the small diameter portion 12c of the first outer-ring-side sealing member 12 close to the end surface of the rear lid 9. When the second radial labyrinth Lb2 thus structured is provided, during rotation of the axle 2, intrusion of foreign matter into the labyrinth seal Ls is effectively prevented by the centrifugal force to act into the second radial labyrinth Lb2 in accordance with rotation of the axle 2. Further, even when foreign matter intrudes into the labyrinth seal Ls (second radial labyrinth Lb2), the above-mentioned centrifugal force causes the foreign matter to be smoothly discharged to the outside of the bearing.

The labyrinth seal Ls in this embodiment further comprises a third radial labyrinth Lb3 extending from an end portion on the bearing internal side of the first axial labyrinth La1 to the outer diameter side. The third radial labyrinth Lb3 is formed by arranging the second annular portion 13d of the second outer-ring-side sealing member 13 close to a shoulder surface 4c of the inner ring 4. With this, an effect of preventing leakage of the lubricant filling the inner space of the roller bearing 3 to the outside is enhanced. The third radial labyrinth Lb3 is formed between the outer-ring-side sealing member 11 (second outer-ring-side sealing member 13) and the inner ring 4, and hence a width accuracy thereof can be easily enhanced. As a result, high sealing performance can be secured.

In addition, on a path of the labyrinth seal Ls in this embodiment, there is provided a branch portion 32 having an end portion on the bearing internal side free from being communicated to the opening portion formed between the inner ring 4 and the outer ring 5. The branch portion 32 in this embodiment is formed of an annular space extending from an inner diameter end portion of the second radial labyrinth Lb2 to the inner diameter side. This annular space is formed by arranging an end surface of the intermediate member 30 (end surfaces of the cylindrical portion 30b and the elastic portion 31) close to the end surface of the rear lid 9 opposed thereto.

When such a branch portion 32 is provided, even when foreign matter intrudes into the labyrinth seal Ls, at least a part of the foreign matter can be captured by the branch portion 32, which is advantageous in lowering a risk of intrusion of foreign matter into the bearing inner space. In particular, as in this embodiment, when the branch portion 32 is formed of the annular space extending from the inner diameter end portion of the second radial labyrinth Lb2 to the inner diameter side, the foreign matter captured by the branch portion 32 is smoothly discharged to the outside of the bearing through the second radial labyrinth Lb2 by the centrifugal force to act in accordance with rotation of the axle 2, and in addition, by its own weight.

Hereinabove, description has been made of the axle bearing device 1 according to the embodiment of the present invention. In this context, various modifications may be made to the above-mentioned axle bearing device 1. In the following, description is made of other embodiments of the present invention. The same members and parts as those in the above-mentioned embodiment are denoted by the same reference symbols, and redundant description thereof is omitted.

Figure 3:
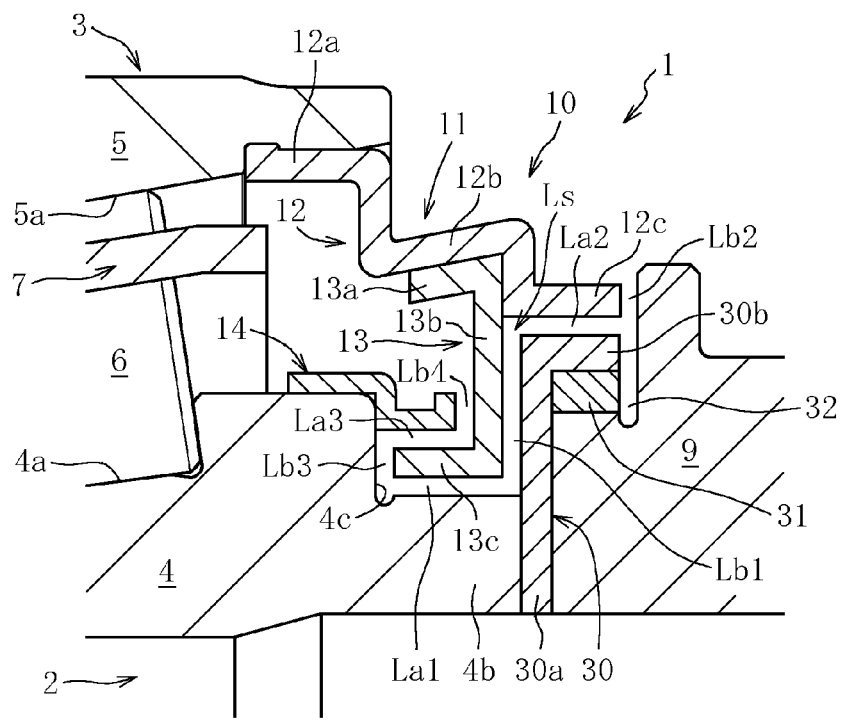
[FIG. 3] A main-part enlarged sectional view of an axle bearing device according to another embodiment of the present invention.

FIG. 3 is a main-part enlarged sectional view of an axle bearing device 1 according to another embodiment of the present invention. The axle bearing device 1 illustrated in FIG. 3 is different from that illustrated in FIG. 2 mainly in that the labyrinth seal Ls further comprises a third axial labyrinth La3 extending in the axial direction from an outer diameter end portion of the third radial labyrinth Lb3, and a fourth radial labyrinth Lb4 extending from an end portion on the bearing internal side of the third axial labyrinth La3 to the outer diameter side. With this, the effect of preventing leakage of the lubricant filling the bearing inner space to the outside is further enhanced. The third axial labyrinth La3 and the fourth radial labyrinth Lb4 are formed between an inner-ring-side sealing member (first inner-ring-side sealing member 14) mounted to an outer surface of the inner ring 4 and the outer-ring-side sealing member 11 (second outer-ring-side sealing member 13). Thus, width accuracies of both the labyrinths La3 and Lb4 can be easily enhanced, with the result that high sealing performance can be secured.

Figure 4:
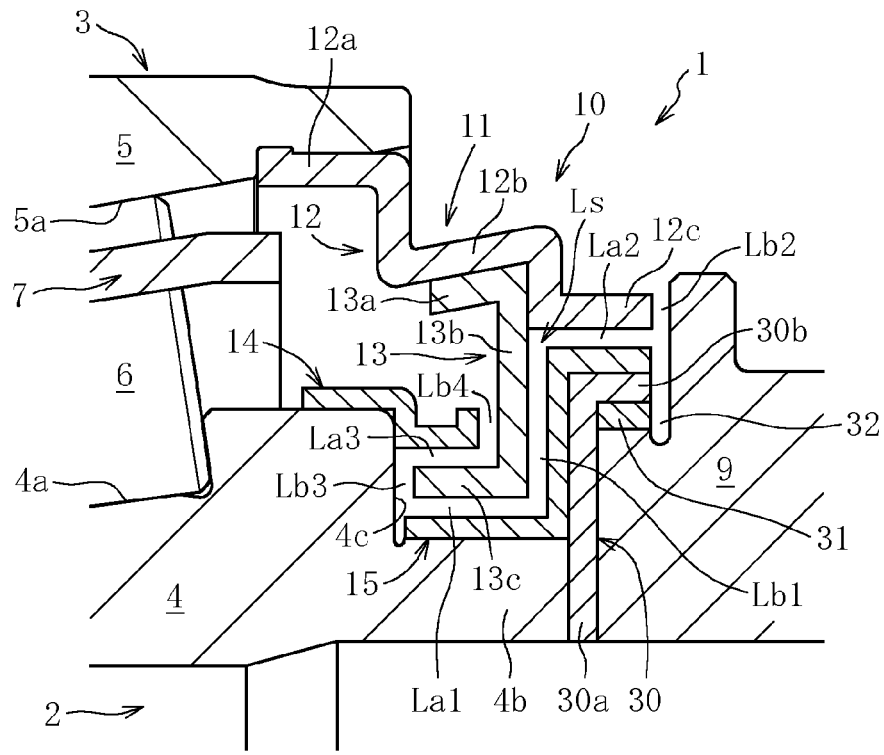
[FIG. 4] A main-part enlarged sectional view of an axle bearing device according to still another embodiment of the present invention.

FIG. 4 is a main-part enlarged sectional view of an axle bearing device 1 according to still another embodiment of the present invention. In the axle bearing device 1 illustrated in FIG. 4, in addition to the above-mentioned first inner-ring-side sealing member 14, a second inner-ring-side sealing member 15 is mounted and fixed to the outer surface of the extended portion 4b of the inner ring 4 so that the first axial labyrinth La1, the first radial labyrinth Lb1, and the second axial labyrinth La2 are formed between the second inner-ring-side sealing member 15 and the outer-ring-side sealing member 11. With this, the width accuracies of the labyrinths La1, Lb1, and La2 can be easily enhanced, and hence sealing performance is further enhanced. Further, an end portion on a counter inner ring side of the second inner-ring-side sealing member 15 is fitted to an outer periphery of the cylindrical portion 30b of the intermediate member 30 so as to hold an outer surface of the intermediate member 30. With this, a fixation force of the intermediate member 30, by extension, the rear lid 9 with respect to the axle 2 is increased. As a result, bearing performance is stabilized.

Figure 5:
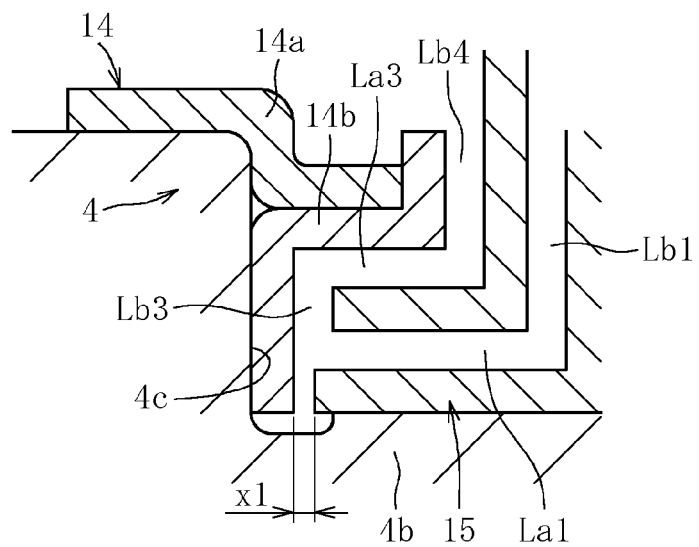
[FIG. 5] A view illustrating a modification example of the axle bearing device illustrated in FIG. 4.

As illustrated in FIG. 5, the first inner-ring-side sealing member 14 may comprise a retaining portion 14a and a sealing portion 14b which are separably provided. The retaining portion 14a is fixed to the outer surface of the inner ring 4, and the sealing portion 14b is fixed to an inner periphery of the retaining portion 14a. With this, the labyrinths Lb3, La3, and Lb4 are formed between the first inner-ring-side sealing member 14 and the second outer-ring-side sealing member 13 of the outer-ring-side sealing member 11. In this case, between the sealing portion 14b and the second inner-ring-side sealing member 15, it is desired to secure an axial gap x1 narrower than a clearance of each of the third radial labyrinth Lb3 and the fourth radial labyrinth Lb4. This is because, even when the retaining portion 14a and the sealing portion 14b are separated from each other, the clearance of each of the radial labyrinths Lb3 and Lb4 can be secured.

Note that, the axle bearing device 1 illustrated in FIG. 4 is obtained by mounting the first inner-ring-side sealing member 14 and the second inner-ring-side sealing member 15 to the inner ring 4 of the axle bearing device 1 illustrated in FIG. 2, but there may be employed a structure in which the first inner-ring-side sealing member 14 is omitted and only the second inner-ring-side sealing member 15 is mounted to the inner ring 4 (not shown).

Figure 6:
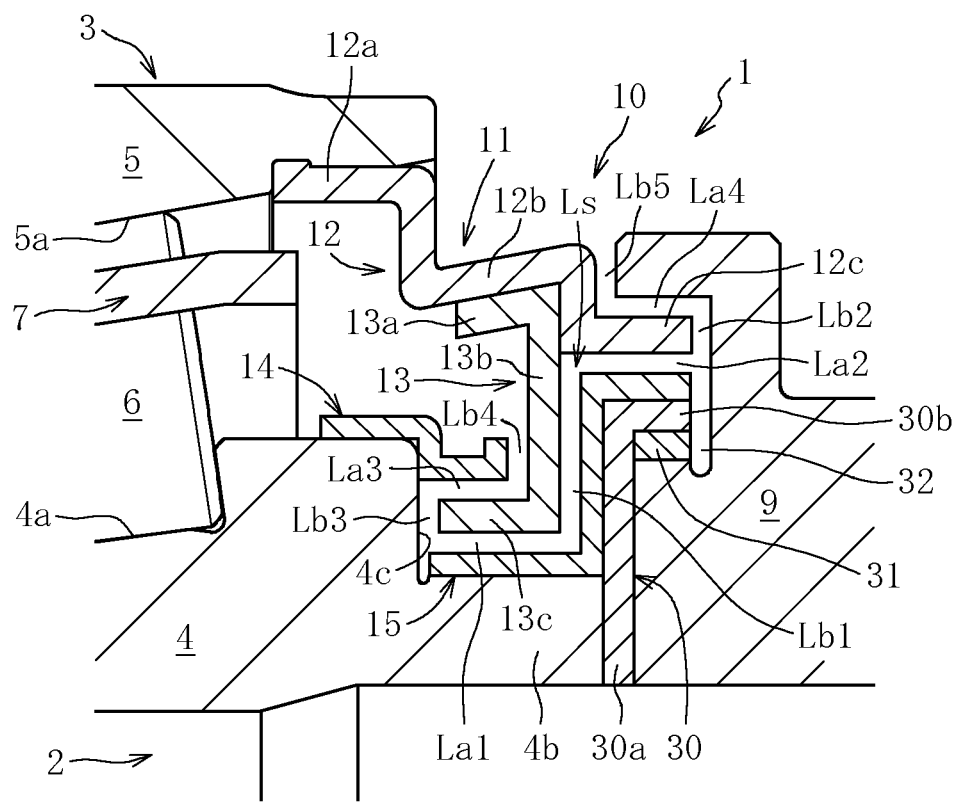
[FIG. 6] A main-part enlarged sectional view of an axle bearing device according to yet another embodiment of the present invention.

FIG. 6 is a main-part enlarged sectional view of an axle bearing device 1 according to yet another embodiment of the present invention, and specifically, illustrates a modification example of the axle bearing device 1 illustrated in FIG. 4. In this embodiment, the rear lid 9 is provided with a cylindrical portion positioned relative to an outer diameter side of the small diameter portion 12c of the first outer-ring-side sealing member 12, and the first outer-ring-side sealing member 12 (small diameter portion 12c and annular part connecting the intermediate diameter portion 12b and the small diameter portion 12c) is arranged close to the cylindrical portion. In this way, there are formed a fourth axial labyrinth La4 extending in the axial direction from an outer diameter end portion of the second radial labyrinth Lb2, and a fifth radial labyrinth Lb5 extending from an end portion on the bearing external side of the fourth axial labyrinth La4 to the outer diameter side. With such a structure, sealing performance can be further enhanced. Note that, the components additionally provided in this embodiment can be added also to the axle bearing devices 1 illustrated in FIGS. 2 and 3.

Figure 7A:
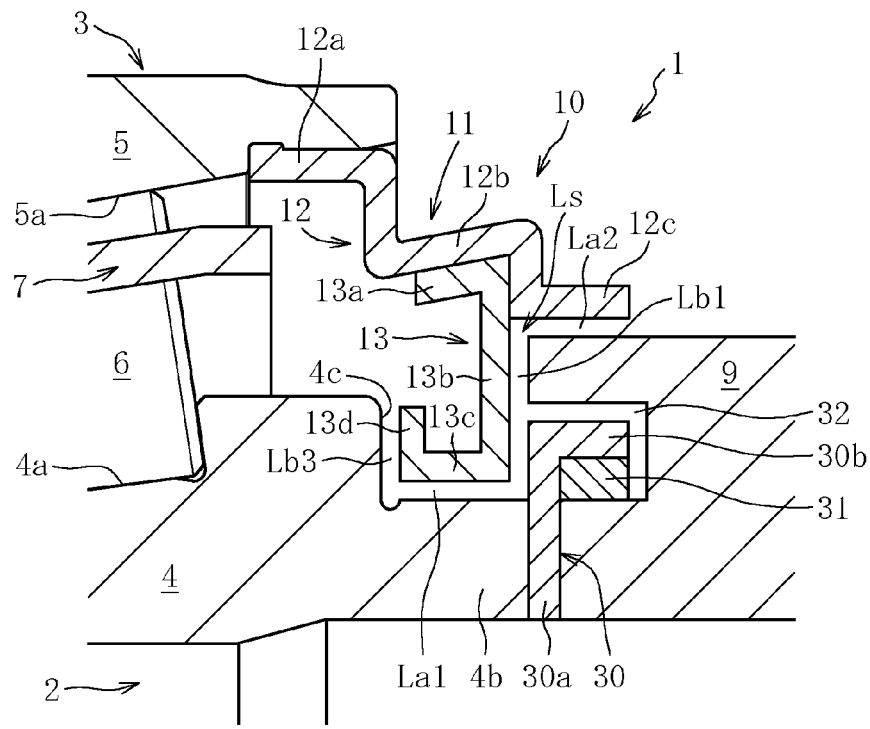
[FIG. 7A] A main-part enlarged sectional view of an axle bearing device according to yet another embodiment of the present invention.

FIG. 7A is a main-part enlarged sectional view of an axle bearing device 1 according to yet another embodiment of the present invention. The axle bearing device 1 illustrated in FIG. 7A is structurally different from the axle bearing device 1 illustrated in FIG. 2 in that the small diameter portion 12c of the first outer-ring-side sealing member 12 is arranged close to the outer surface of the rear lid 9 so that the second axial labyrinth La2 is formed between two opposed surfaces of the small diameter portion 12c and the rear lid 9. Further, in accordance therewith, the branch portion 32 is formed into a reverse L-shape in cross-section to have a part extending in the axial direction and a part extending the radial direction.

Figure 7B:
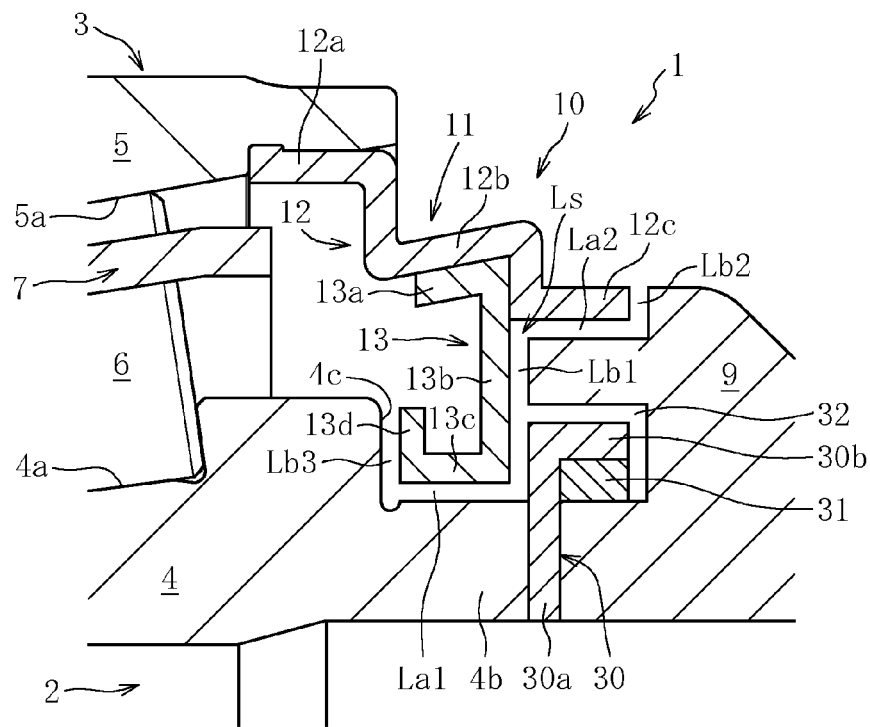
[FIG. 7B] A view illustrating a modification example of the axle bearing device illustrated in FIG. 7A.

In this case, as illustrated in FIG. 7B, the rear lid 9 may be formed so that the second radial labyrinth Lb2 extending from the end portion on the bearing external side of the second axial labyrinth La2 to the outer diameter side can be formed between the rear lid 9 and the small diameter portion 12c of the first outer-ring-side sealing member 12.

Figure 8:
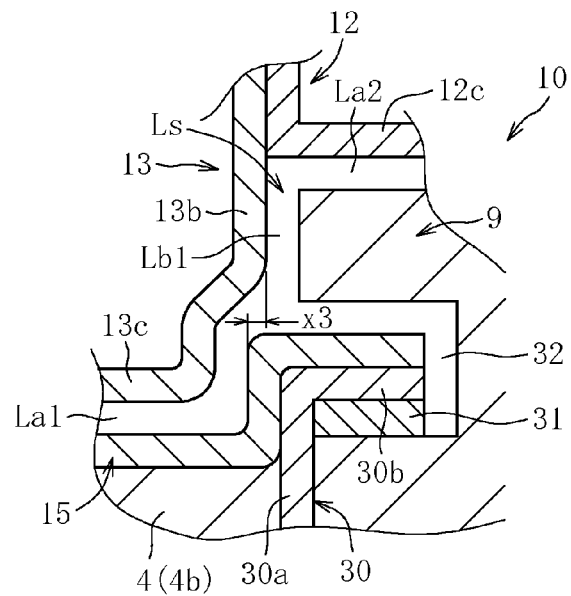
[FIG. 8] A view illustrating a modification example of the axle bearing devices illustrated in FIGS. 7A and 7B.

Further, particularly in the axle bearing device 1 illustrated in FIGS. 7A and 7B, the first radial labyrinth Lb1 forming the labyrinth seal Ls may be formed into a bent form as illustrated in FIG. 8. Specifically, an inner diameter portion of the first annular portion 13b of the second outer-ring-side sealing member 13 is bent to the roller bearing 3 side so that an outer diameter portion of the first annular portion 13b (part facing the end surface of the rear lid 9) and a part extending in the radial direction of the second inner-ring-side sealing member 15 are overlapped with each other in the axial direction. In other words, shapes and the like of the members are changed so that a dimension indicated by reference symbol x3 in FIG. 8 satisfies a relational expression x3>0. With this, in comparison with the structures illustrated in FIGS. 7A and 7B, foreign matter intruding into the first radial labyrinth Lb1 is more likely to be directed to the branch portion 32 side. Thus, an effect of preventing intrusion of foreign matter into the bearing inner space is enhanced in comparison with that in the structures illustrated in FIGS. 7A and 7B.

Figure 9A:
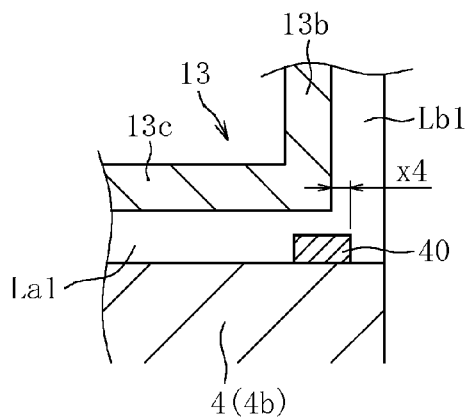
[FIG. 9A] A main-part enlarged view of an axle bearing device according to yet another embodiment of the present invention.
Figure 9B:
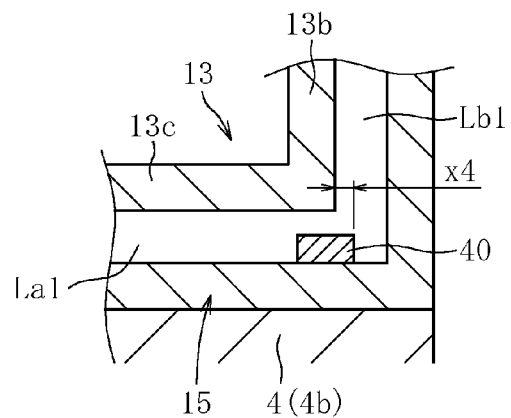
[FIG. 9B] A main-part enlarged view of an axle bearing device according to yet another embodiment of the present invention.

In any of the axle bearing devices 1 according to the embodiments described hereinabove, in order to further enhance the effect of preventing intrusion of foreign matter from the bearing external side, one or more annular protrusions 40 for partially reducing the clearance of the first axial labyrinth La1 may be provided on at least one of two opposed surfaces forming the first axial labyrinth La1 of the labyrinth seal Ls (refer to FIGS. 9A and 9B). FIG. 9A illustrates a case where the one annular protrusion 40 is provided on the outer surface of the extended portion 4b of the inner ring 4 in the embodiment illustrated, for example, in FIG. 2. FIG. 9B illustrates a case where the one annular protrusion 40 is provided on an outer surface of the second inner-ring-side sealing member 15 in the embodiment illustrated, for example, in FIG. 4.

Note that, it is desired that the above-mentioned annular protrusion 40 be provided to partially protrude into the first radial labyrinth Lb1. In other words, it is desired that the annular protrusion 40 be provided so that a dimension indicated by reference symbol x4 in FIGS. 9A and 9B satisfies a relational expression x4>0. This is because, with this setting, an effect of discharging foreign matter with the centrifugal force to act in accordance with rotation of the axle 2 can be enhanced.

Figure 10A:
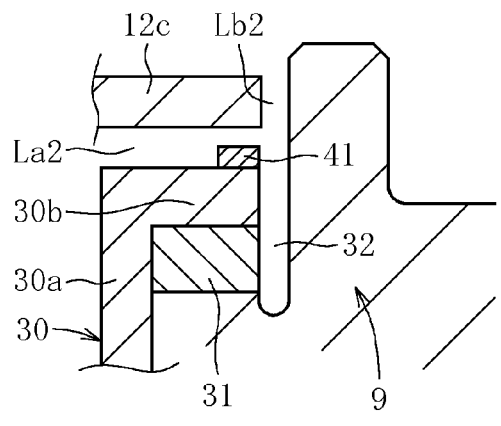
[FIG. 10A] A main-part enlarged view of an axle bearing device according to yet another embodiment of the present invention.
Figure 10B:
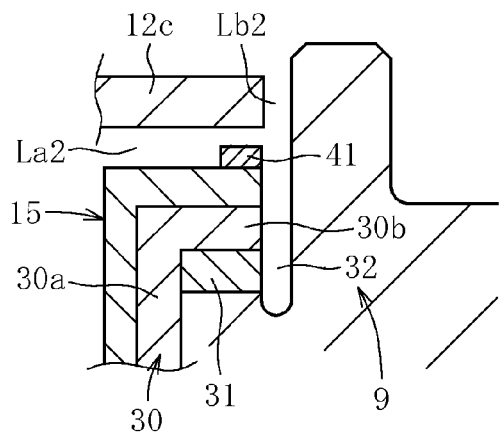
[FIG. 10B] A main-part enlarged view of an axle bearing device according to yet another embodiment of the present invention.
Figure 10C:
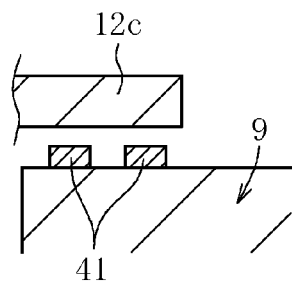
[FIG. 10C] A main-part enlarged view of an axle bearing device according to yet another embodiment of the present invention.

Further, in any of the axle bearing devices 1 according to the embodiments described hereinabove, in order to further enhance the effect of preventing intrusion of foreign matter from the bearing external side, one or more annular protrusions 41 for partially reducing the clearance of the second axial labyrinth La2 may be provided on at least one of two opposed surfaces forming the second axial labyrinth La2 of the labyrinth seal Ls (refer to FIGS. 10A to 10C). Note that, FIG. 10A illustrates a case where the one annular protrusion 41 is provided on the outer surface of the cylindrical portion 30b of the intermediate member 30 in the embodiment illustrated, for example, in FIG. 2. FIG. 10B illustrates a case where the one annular protrusion 41 is provided on the outer surface of the second inner-ring-side sealing member 15 mounted to the inner ring 4 in the embodiment illustrated, for example, in FIG. 4. Further, FIG. 10C illustrates a case where two annular protrusions 41 are provided on the outer surface of the rear lid 9 in the embodiments illustrated in FIGS. 7 and 8.

Figure 11:
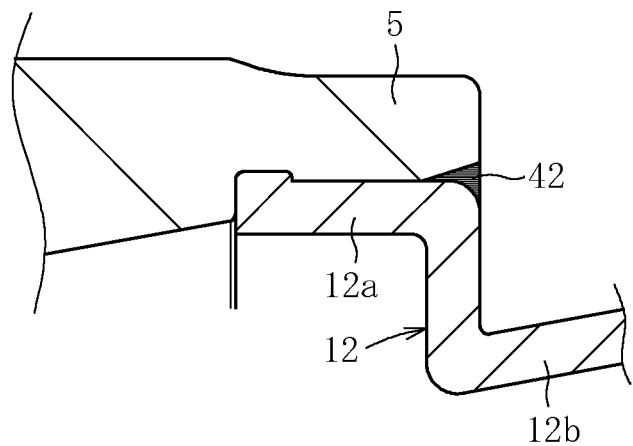
[FIG. 11] A main-part enlarged view illustrating a modification example of an axle bearing device according to the present invention.

In addition, in any of the axle bearing devices 1 according to the embodiments described hereinabove, as illustrated in FIG. 11, an elastic seal 42 made of rubber or a resin may be interposed between an inner surface of the outer ring 5 and an outer surface of the first outer-ring-side sealing member 12. With this, sealability between the outer ring 5 and the first outer-ring-side sealing member 12 can be enhanced, with the result that intrusion of foreign matter and leakage of lubricant through a gap formed therebetween are prevented.

Figure 12:
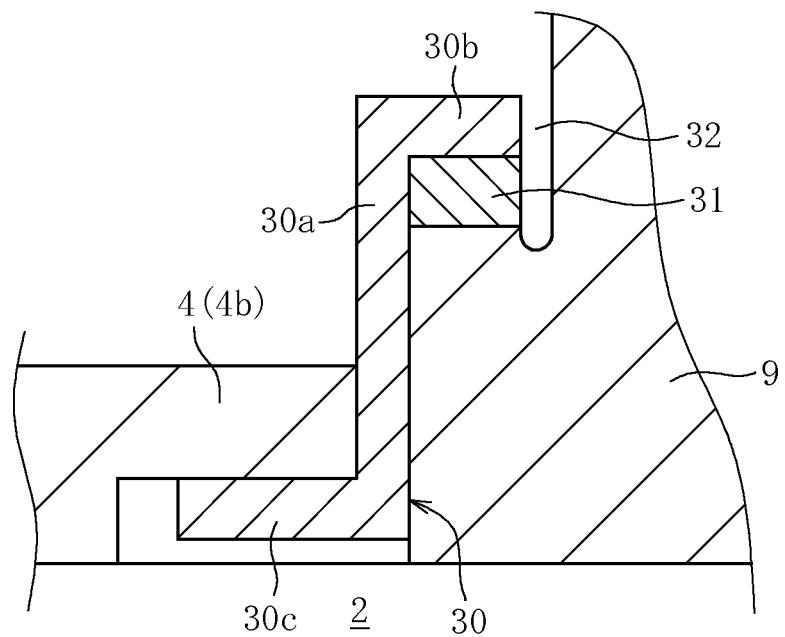
[FIG. 12] A main-part enlarged view illustrating another modification example of an axle bearing device according to the present invention.

In the embodiments described hereinabove, the intermediate member 30 as a branch portion forming member interposed between the extended portion 4b of the inner ring 4 and the rear lid 9 is fixed to an outer surface of the axle 2. However, as illustrated in FIG. 12, a small diameter portion 30c extending in the axial direction from an inner diameter end portion of the annular portion 30a may be provided integrally with the intermediate member 30 so that the small diameter portion 30c is fitted to an inner surface of the extended portion 4b of the inner ring 4. With this, the axle bearing devices 1 can be easily assembled and disassembled.

Further, in any of the axle bearing devices 1 according to the embodiments described hereinabove, it is desired that a capacity of an annular space to be formed between an end portion of the roller bearing 3 and the outer-ring-side sealing member 11 be set to at least ½ or more of a total amount of the lubricant filling the bearing inner space (total volume of the lubricant). This is because, with this setting, leakage of the lubricant to the outside is prevented as much as possible while lubrication performance of the roller bearing 3 is sufficiently secured.

Hereinabove, description is made of the case where the present invention is applied to the axle bearing device 1 using a double row tapered roller bearing as the roller bearing 3. As a matter of course, the present invention described hereinabove is applicable also to an axle bearing device 1 using other bearings such as a double row cylindrical roller bearing as the roller bearing 3.

In the following, description is made of still other embodiments of the present invention with reference to the drawings.

Figure 13:
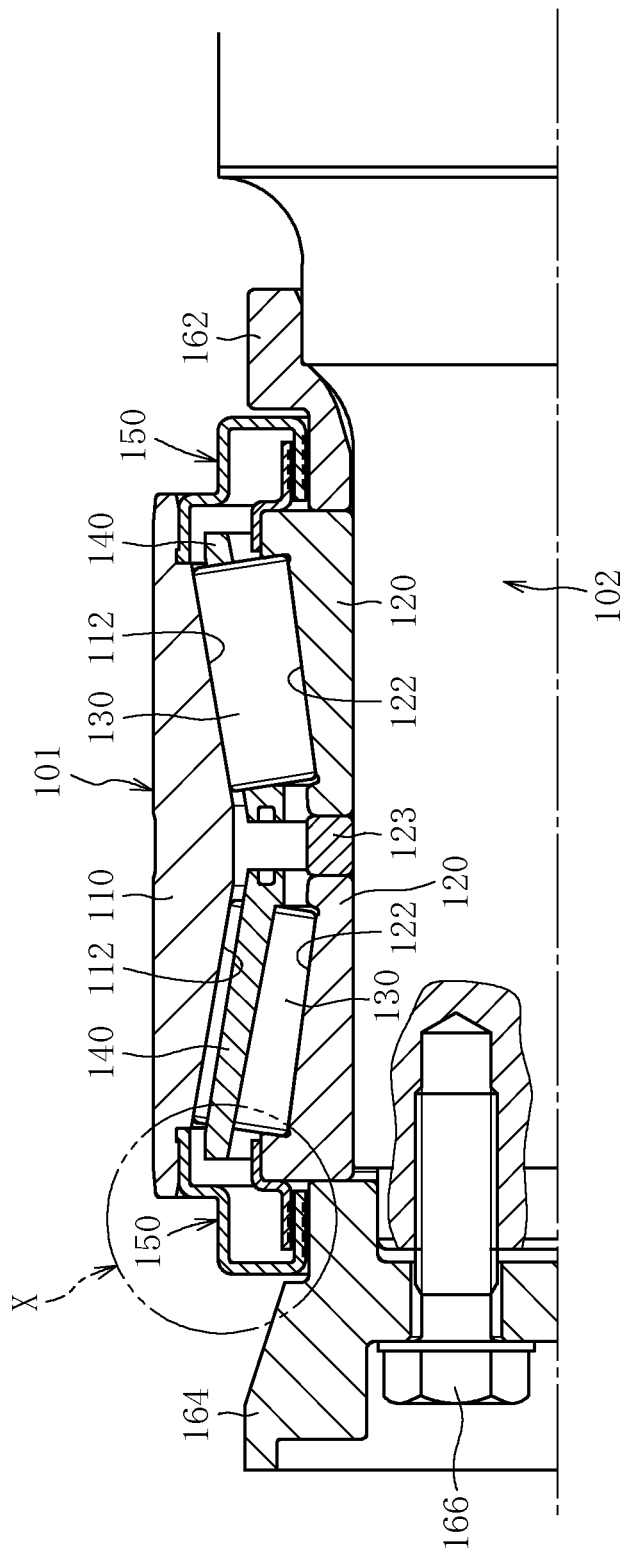
[FIG. 13] An axial sectional view of an axle bearing device according to yet another embodiment of the present invention.

FIG. 13 illustrates an axle bearing device according to yet another embodiment of the present invention. This axle bearing device is used for supporting an axle of a railway vehicle, and comprises a roller bearing 101 and a pair of sealing devices 150 and 150 arranged on both sides in an axial direction of the roller bearing 101.

The roller bearing 101 is what is called a double row tapered roller bearing, and comprises, as main components, an outer ring 110, a pair of inner rings 120 and 120, a plurality of tapered rollers 130 as rolling elements arranged in double rows, and a pair of retainers 140 and 140 for retaining the tapered rollers 130 in each row at predetermined intervals in a circumferential direction. The outer ring 110 has an inner peripheral surface provided with double row tapered outer raceway surfaces 112. The inner rings 120 and 120 in a pair are adjacent to each other in the axial direction through intermediation of a distance piece, and the inner rings 120 each has an outer peripheral surface provided with a tapered inner raceway surface 122. The tapered rollers 130 are interposed in a freely rollable manner between the outer raceway surfaces 112 of the outer ring 110 and the inner raceway surfaces 122 of the inner rings 120. Lubricant such as grease is sealed in a space formed between the outer ring 110 and the inner rings 120 (inner space of the roller bearing 101), and the sealing devices 150 seal this space at both end portions in the axial direction. Note that, in this embodiment, a double row tapered roller bearing is employed as the roller bearing 101, but the present invention is not particularly limited thereto. For example, other bearings such as a double row cylindrical roller bearing may be employed.

The outer ring 110 has an outer peripheral surface fixed to a journal box (not shown) of a railway vehicle. An oil slinger 162 is arranged in abutment against one end in the axial direction of the pair of inner rings 120 and 120. A lid member 164 is arranged in abutment against another end in the axial direction of the pair of inner rings 120. The lid member 164 is fixed to a shaft end of an axle 102 with a bolt 166 so that the oil slinger 162, the pair of inner rings 120 and 120, and a distance piece 123, which are fitted to an outer periphery of the axle 102, are sandwiched and fixed in the axial direction between the lid member 164 and a shoulder portion of the axle 102.

The sealing devices 150 and 150 in a pair are arranged respectively at both ends in the axial direction of the roller bearing 101, and both sealing devices 150 and 150 each have substantially the same structure. Thus, in the following, for the sake of simplification of description, description is made only of the sealing device 150 on the shaft end side of the axle 102 (left side of FIG. 13), and description of the sealing device 150 on a proximal end side of the axle 102 (right side of FIG. 13) is omitted.

Figure 14:
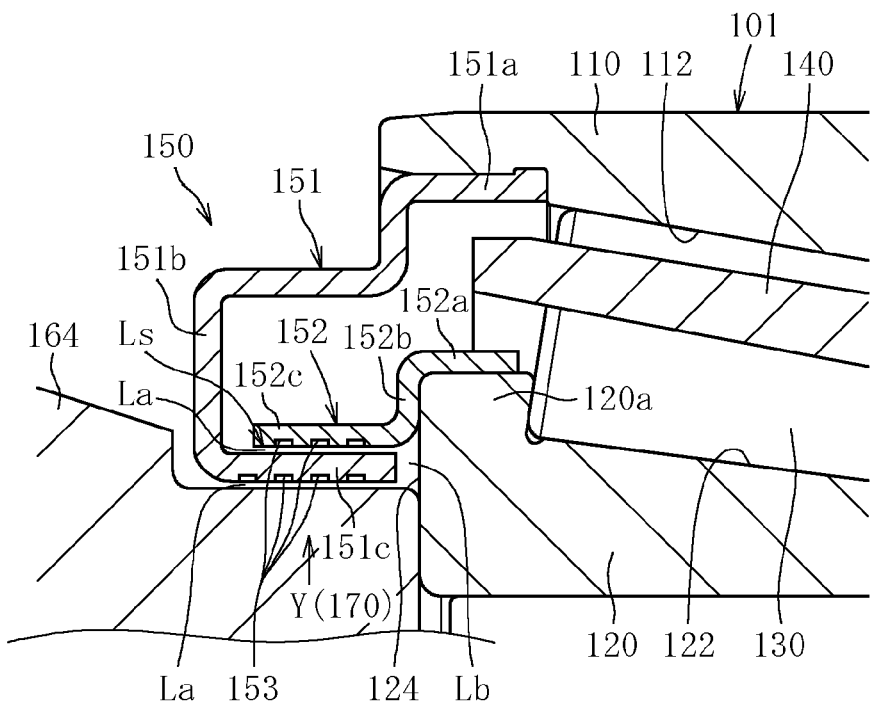
[FIG. 14] An enlarged view of a part X of FIG. 13.

As illustrated on an enlarged scale in FIG. 14, the sealing device 150 comprises an outer-ring-side sealing member 151 mounted to the outer ring 110, and an inner-ring-side sealing member 152 mounted to the inner ring 120. An opening portion at one end of the roller bearing 101 is sealed by the labyrinth seal Ls formed in cooperation among the sealing members 151 and 152, the inner ring 120, and the lid member 164 as a separate member. Although detailed description is made below, the labyrinth seal Ls has a bent form comprising at least one axial labyrinth La extending in the axial direction and at least one radial labyrinth Lb extending in the radial direction.

The outer-ring-side sealing member 151 extends from the outer ring 110 to an end surface 124 of the inner ring 120, and comprises a cylindrical mount portion 151a mounted to an inner periphery of the opening portion of the outer ring 110, for example, by press-fitting, a main body portion 151b extending from the mount portion 151a so as to be close to an outer surface of the lid member 164, and a cylindrical outer-ring-side sealing portion 151c extending in the axial direction from the main body portion 151b to the end surface 124 of the inner ring 120. In this embodiment, the main body portion 151b has a bent shape comprising an annular portion extending radially inward from an end portion of the mount portion 151a, another annular portion extending radially outward from an end portion of the outer-ring-side sealing portion 151c, and a cylindrical portion connecting both the annular portions to each other. Further, in this embodiment, the outer-ring-side sealing portion 151c functions as a seal extended portion 170 of the present invention.

Meanwhile, the inner-ring-side sealing member 152 comprises a cylindrical mount portion 152a mounted to an outer periphery of a flange portion 120a of the inner ring 120, for example, by press-fitting, an annular main body portion 152b extending radially inward from the mount portion 152a, and a cylindrical inner-ring-side sealing portion 152c extending from the main body portion 152b to a counter inner ring 120 side.

In this embodiment, the axial labyrinth La formed between an inner peripheral surface of the inner-ring-side sealing portion 152c and an outer peripheral surface of the outer-ring-side sealing portion 151c (seal extended portion 170) facing each other, the radial labyrinth Lb formed between a leading end surface of the outer-ring-side sealing portion 151c and the end surface 124 of the inner ring 120 facing each other, and another axial labyrinth La formed between an inner peripheral surface of the outer-ring-side sealing portion 151c and an outer peripheral surface of the lid member 164 facing each other form the labyrinth seal Ls.

Figure 15:
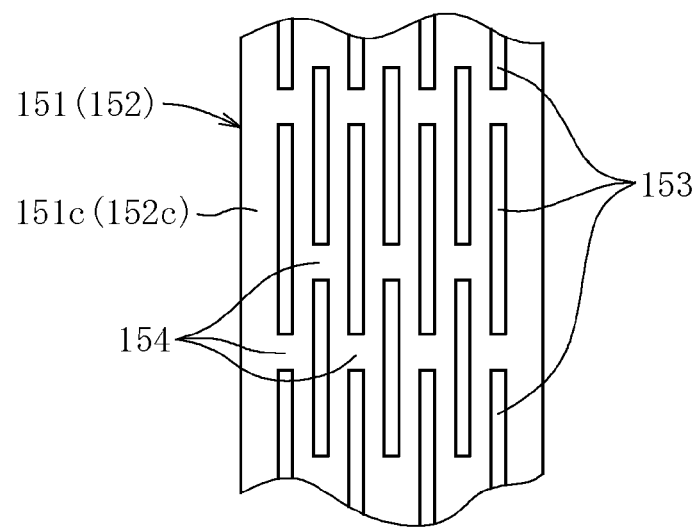
[FIG. 15] A view viewed in a direction of the arrow Y in FIG. 14.

The inner peripheral surface of the inner-ring-side sealing portion 152c and the inner peripheral surface of the outer-ring-side sealing portion 151c are each provided with a projection-recess portion. Specifically, as illustrated in FIG. 15, a plurality of arrays of groove portions 153 formed intermittently in the circumferential direction are arrayed across the axial direction, and non-groove portions 154 in arrays provided adjacently in the axial direction are located at positions different from each other in the circumferential direction. A shape of the projection-recess portion is not limited thereto, and for example, in FIG. 15, projection portions may be provided at parts corresponding to the groove portions 153. Alternatively, for example, recessed portions and projection portions may be provided in a dispersed manner on the inner peripheral surface. Still alternatively, the projection-recess portion may be provided on each of the outer peripheral surface of the outer-ring-side sealing portion 151c and the outer peripheral surface of the lid member 164 facing each other across the another axial labyrinth La.

The above-mentioned structure has the following advantages.

In the axle bearing device, one axial labyrinth La and one radial labyrinth Lb are formed respectively between the outer-ring-side sealing member 151 and the inner-ring-side sealing member 152 mounted respectively to the outer ring 110 and the inner ring 120 finished with high accuracy and between the outer-ring-side sealing member 151 and the inner ring 120, and the opening portion of the roller bearing 101 is sealed by the labyrinth seal Ls comprising those axial labyrinth La and radial labyrinth Lb. On a bearing device manufacturer's side, at least width accuracies of those labyrinths La and Lb can be managed, and hence sealing performance of the labyrinth seal Ls can be enhanced. Further, the outer-ring-side sealing member 151 extends from the outer ring 110 toward the end surface 124 of the inner ring 120, and hence the outer-ring-side sealing member 151 is provided with a part swelling to the outside of the bearing inner space. Thus, a form of the outer-ring-side sealing member 151 is similar to that of a conventional sealing assembly comprising a sealing member and a sealing case. As a result, replacement of such a conventional sealing assembly can be performed without changing design around the bearing device. Further, mounting and removing with respect to the outer ring 110 are facilitated.

A tapered roller bearing (double row tapered roller bearing) is employed as the roller bearing 101 of the axle bearing device according to this embodiment. In this tapered roller bearing, the centrifugal force to act on each portion of the bearing during operation causes a force toward both the end sides in the axial direction to act on the lubricant (grease) sealed in the inner space. Thus, it is significantly important to enhance sealing performance of a non-contact seal for the tapered roller bearing. With this regard, in this embodiment, the sealing device 150 structured as described above is employed, and hence the desired sealing performance can be secured.

Further, with regard to the axial labyrinth La and the radial labyrinth Lb formed respectively between the seal extended portion 170 of the outer-ring-side sealing member 151 and the inner-ring-side sealing member 152 and between the seal extended portion 170 of the outer-ring-side sealing member 151 and the inner ring 120, those portions can be designed irrespective of the lid member 164. Thus, the sealing device 150 can be designed to have the same size or a size smaller than that of a conventional sealing device, and hence such a conventional sealing device can be replaced with the sealing device 150 described hereinabove. Further, the one axial labyrinth La and the one radial labyrinth Lb are formed irrespective of the lid member 164, and hence such a situation that sealing performance of the labyrinth seal Ls varies from product to product is prevented.

Figure 26:
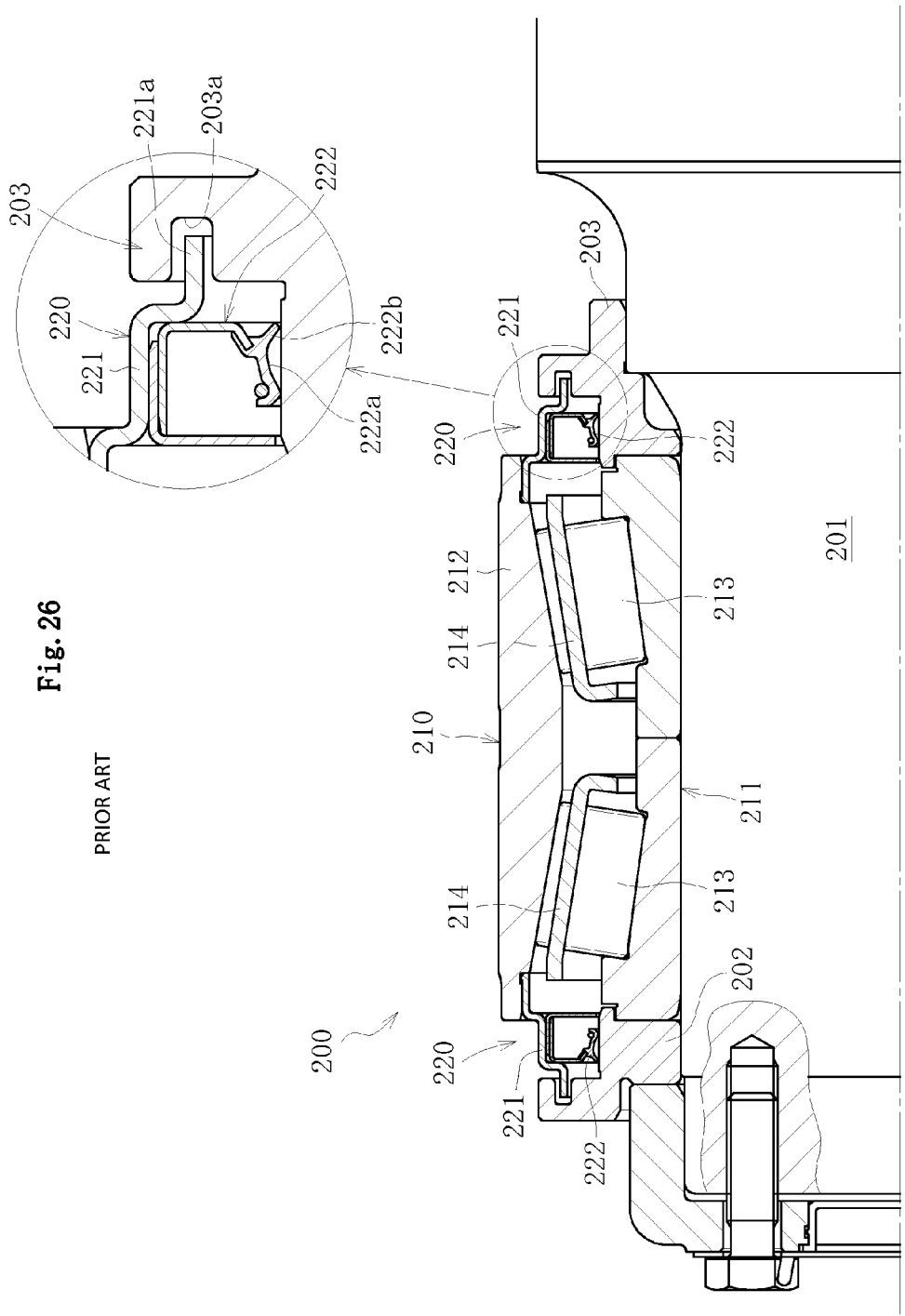
[FIG. 26] An axial sectional view of an overall structure of a conventional axle bearing device.

Further, as in the conventional structure illustrated in FIG. 26, when contact seals are formed between the roller bearing and members arranged on an outer side in the axial direction of a roller bearing (front lid 202 and rear lid 203 in the example of FIG. 26), it is necessary to especially carefully assemble components such as the roller bearing to an axle. Meanwhile, as in the axle bearing device according to this embodiment, when such contact seals to be formed between the roller bearing 101 and the lid member 164 are not employed, the roller bearing 101 and the lid member 164 can be easily assembled to the axle 102. In this embodiment, the another axial labyrinth La is formed also between the outer-ring-side sealing portion 151c as the seal extended portion 170 and the lid member 164. When an advantage of the another axial labyrinth La is not emphasized, a design in which a large radial clearance is secured between the sealing device 150 and the lid member 164 can be employed. In this case, when the roller bearing 101 and the lid member 164 are assembled to the axle 102, interference of the sealing device 150 and the lid member 164 can be suppressed. For those reasons, assembly operability of the roller bearing 101 and the lid member 164 with respect to the axle 102 can be enhanced.

Further, the projection-recess portion is provided on each of the inner peripheral surface of the inner-ring-side sealing portion 152c, which is one of the surfaces to form the axial labyrinth La on the relatively outer diameter side, and the inner peripheral surface of the outer-ring-side sealing portion 151c, which is one of the surfaces to form the another axial labyrinth La on a relatively inner diameter side. With this, in each of the axial labyrinths La, wide parts and narrow parts can be alternately formed. As a result, sealing performance in each of the axial labyrinths La can be enhanced.

In the following, description is made of yet other embodiments of the present invention. The same components as those in the embodiment described with reference to FIGS. 13 to 15 are denoted by the same reference symbols, and redundant description thereof is omitted.

Figure 16:
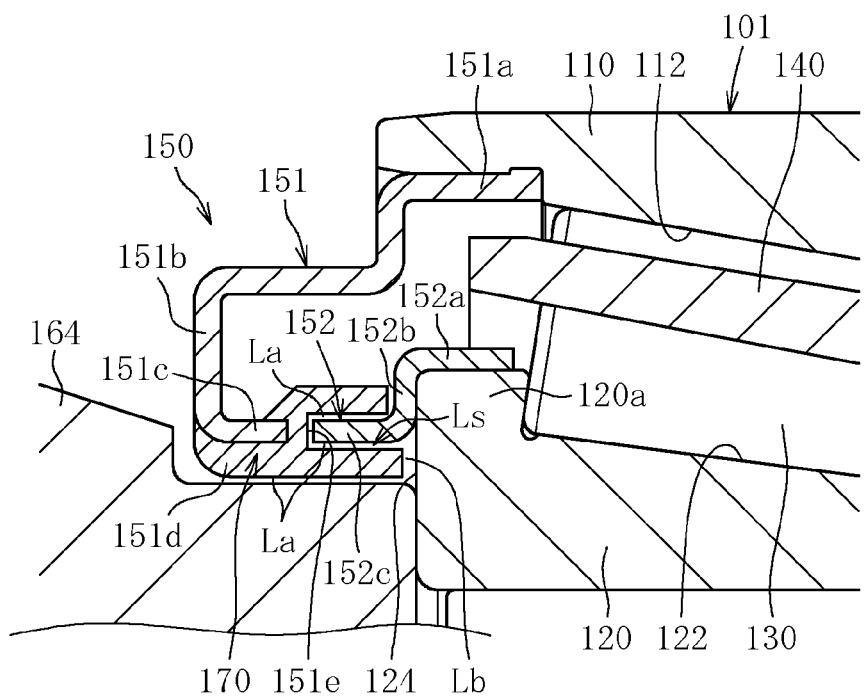
[FIG. 16] A main-part enlarged sectional view of an axle bearing device according to yet another embodiment of the present invention.

FIG. 16 is a main-part enlarged sectional view of an axle bearing device according to yet another embodiment of the present invention. In this embodiment, the outer-ring-side sealing portion 151c is provided with a recessed portion 151e, and a leading end of the inner-ring-side sealing member 152 is accommodated in the recessed portion 151e. Specifically, an elastic portion 151d made of an elastic material such as rubber or a resin is mounted to the outer-ring-side sealing portion 151c so that the seal extended portion 170 is formed, and the elastic portion 151d forming the seal extended portion 170 is provided with the recessed portion 151e opened to the inner ring 120 side. Two axial labyrinths La and La and a radial labyrinth Lb connecting those axial labyrinths La and La to each other are formed between the recessed portion 151e of the elastic portion 151d and the leading end portion of the inner-ring-side sealing portion 152c, which is accommodated in the recessed portion 151e. In addition, other radial labyrinths Lb are formed respectively between an opening end surface of the elastic portion 151d (opening end surface on a relatively inner side) and the end surface 124 of the inner ring 120, and between another opening end surface of the elastic portion 151d (opening end surface on a relatively outer side) and the main body portion 152b of the inner-ring-side sealing member 152. Further, another axial labyrinth La is formed between an inner peripheral surface of the elastic portion 151d (seal extended portion 170) and the outer peripheral surface of the lid member 164 facing each other.

Figure 17:
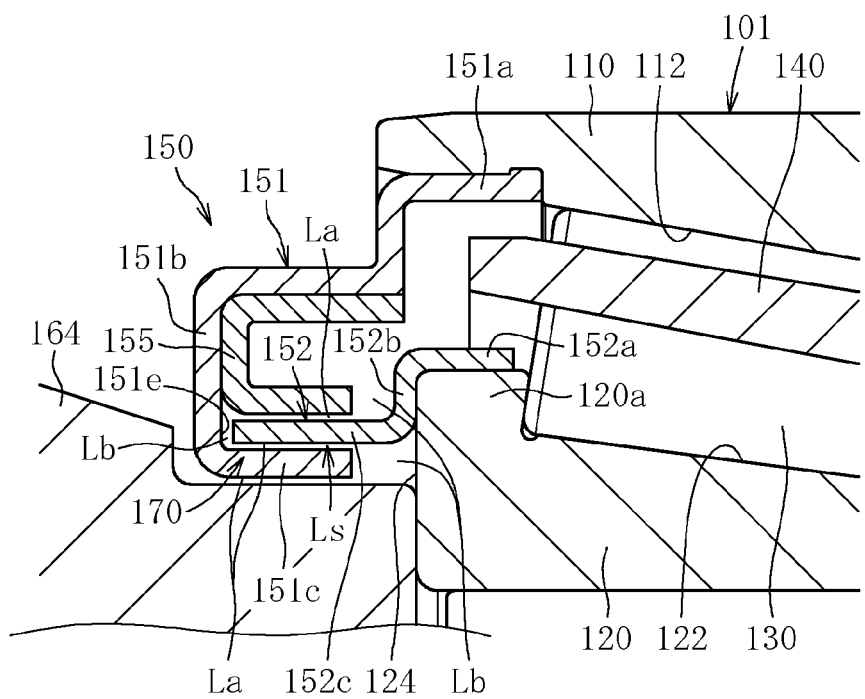
[FIG. 17] A main-part enlarged sectional view of an axle bearing device according to yet another embodiment of the present invention.

FIG. 17 is a main-part enlarged sectional view of an axle bearing device according to yet another embodiment of the present invention. Also in this embodiment, as in the embodiment illustrated in FIG. 16, the outer-ring-side sealing member 151 is provided with the recessed portion 151e, and the leading end of the inner-ring-side sealing member 152 is accommodated in the recessed portion 151e. With this, axial labyrinths La and radial labyrinths Lb are formed. The axle bearing device in this embodiment is different from that illustrated in FIG. 16 in that a separate member 155 is mounted to an inner periphery of the outer-ring-side sealing member 151. With this, the seal extended portion 170 is formed of the outer-ring-side sealing portion 151c and (an inner diameter side cylindrical portion of) the separate member 155, and the recessed portion 151e is defined by the outer-ring-side sealing member 151 and the separate member 155 mounted to the outer-ring-side sealing member 151.

Figure 18:
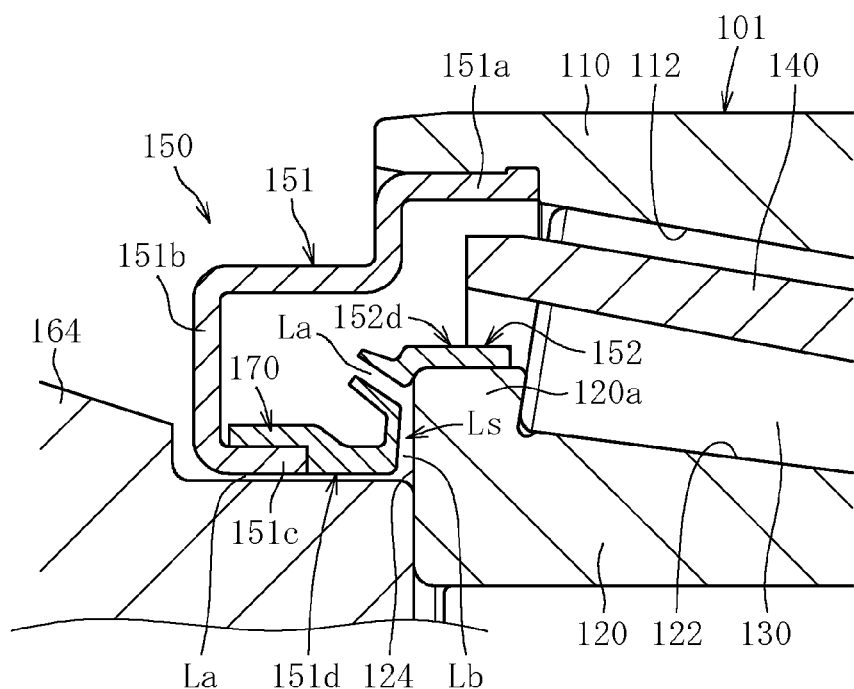
[FIG. 18] A main-part enlarged sectional view of an axle bearing device according to yet another embodiment of the present invention.

FIG. 18 is a main-part enlarged sectional view of an axle bearing device according to yet another embodiment of the present invention. In this embodiment, the elastic portion 151d made of an elastic material is mounted to the outer-ring-side sealing portion 151c so that the seal extended portion 170 is formed. In addition, another elastic portion 152d made of an elastic material is provided to the inner-ring-side sealing member 152, and an axial labyrinth La (in the illustration, inclined at a predetermined angle with respect to the axial direction) forming the labyrinth seal Ls is formed between both the elastic portions 151d and 152d. Note that, in this embodiment, the entire inner-ring-side sealing member 152 is formed of the elastic portion 152d. Further, a radial labyrinth Lb and another axial labyrinth La which form the labyrinth seal Ls are formed respectively between an end surface of the seal extended portion 170 (elastic portion 151d) and the end surface 124 of the inner ring 120 facing each other, and between an inner peripheral surface of the seal extended portion 170 and the outer peripheral surface of the lid member 164.

Figure 19:
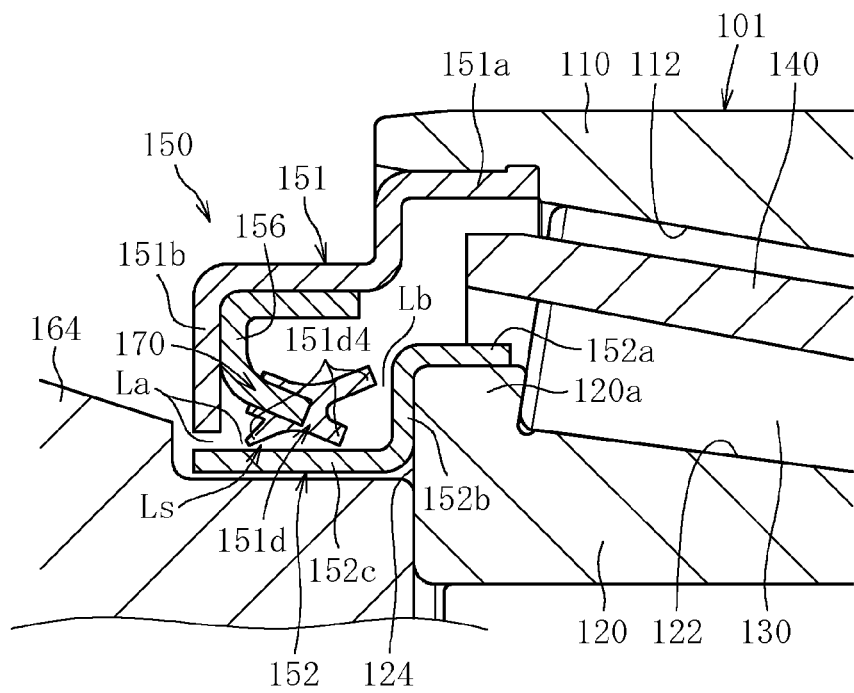
[FIG. 19] A main-part enlarged sectional view of an axle bearing device according to yet another embodiment of the present invention.

FIG. 19 is a main-part enlarged sectional view of an axle bearing device according to yet another embodiment of the present invention. In this embodiment, a separate member 156 substantially L-shaped in cross-section is mounted to the inner periphery of the outer-ring-side sealing member 151 in which the outer-ring-side sealing portion 151c is absent, and the elastic portion 151d made of an elastic material is mounted to one end of the separate member 156 so that the seal extended portion 170 is formed. In this way, narrow portions of an axial labyrinth La and a radial labyrinth Lb which form the labyrinth seal Ls are formed between a plurality of lips 151d4 provided to the elastic portion 151d forming the seal extended portion 170 and the inner-ring-side sealing member 152.

Figure 20:
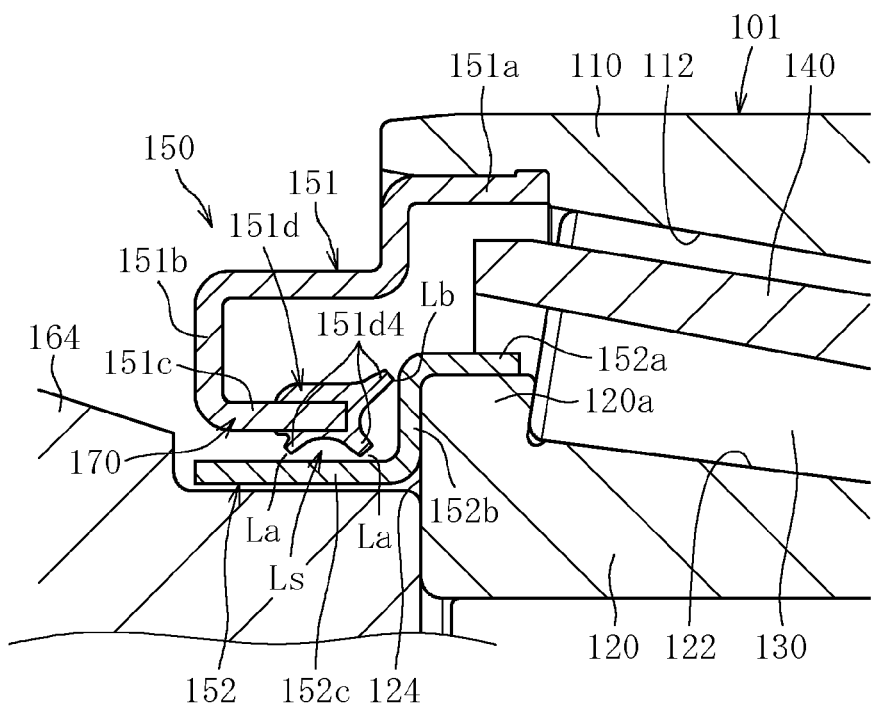
[FIG. 20] A main-part enlarged sectional view of an axle bearing device according to yet another embodiment of the present invention.

FIG. 20 is a main-part enlarged sectional view of an axle bearing device according to yet another embodiment of the present invention. In this embodiment, the elastic portion 151d made of an elastic material is mounted to the outer-ring-side sealing portion 151c of the outer-ring-side sealing member 151 so that the seal extended portion 170 is formed. In this way, narrow portions of an axial labyrinth La and a radial labyrinth Lb which form the labyrinth seal Ls are formed between the plurality of lips 151d4 provided to the elastic portion 151d forming the seal extended portion 170 and the inner-ring-side sealing member 152.

Figure 21:
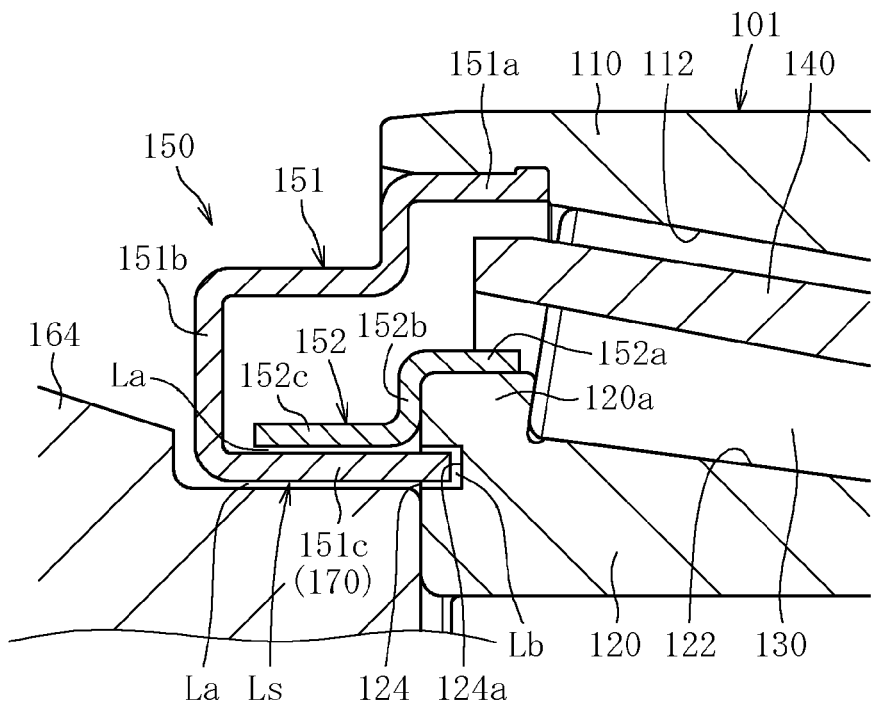
[FIG. 21] A main-part enlarged sectional view of an axle bearing device according to yet another embodiment of the present invention.

FIG. 21 is a main-part enlarged sectional view of an axle bearing device according to yet another embodiment of the present invention. In this embodiment, the end surface 124 of the inner ring 120 is provided with a circumferential groove 124a as a recessed portion, and a leading end of the outer-ring-side sealing portion 151c to function as the seal extended portion 170 is accommodated in the circumferential groove 124a. A radial labyrinth Lb is formed between the leading end surface of the outer-ring-side sealing portion 151c and a groove bottom surface of the circumferential groove 124a. Axial labyrinths La are formed in the same way as those in the embodiment illustrated in FIG. 14 except that the groove portions 153 (projection-recess portion) are not provided.

Figure 22:
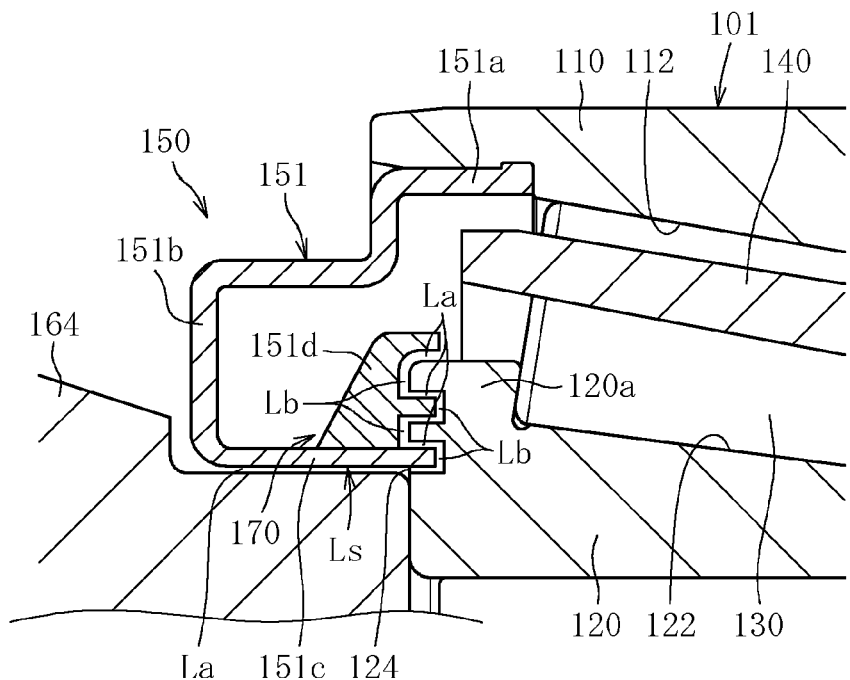
[FIG. 22] A main-part enlarged sectional view of an axle bearing device according to yet another embodiment of the present invention.

FIG. 22 is a main-part enlarged sectional view of an axle bearing device according to yet another embodiment of the present invention. In this embodiment, the elastic portion 151d is mounted to the outer-ring-side sealing portion 151c of the outer-ring-side sealing member 151 so that the seal extended portion 170 is formed. In addition, both two opposed surfaces of the seal extended portion 170 and the inner ring 120 are each provided with a projection-recess portion, and both the projection-recess portions are held in an engaged state. Axial labyrinths La and radial labyrinths Lb forming the labyrinth seal Ls are provided continuously with and alternately to each other between the projection-recess portions held in an engaged state. Further, another axial labyrinth La forming the labyrinth seal Ls is formed between the inner peripheral surface of the outer-ring-side sealing portion 151c forming the seal extended portion 170 and the outer peripheral surface of the lid member 164.

Figure 23:
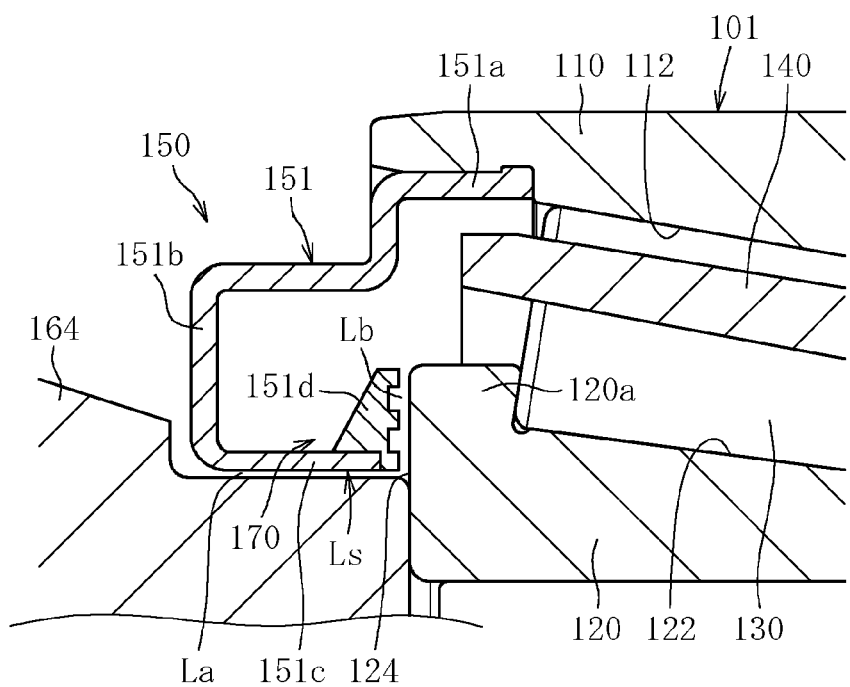
[FIG. 23] A main-part enlarged sectional view of an axle bearing device according to yet another embodiment of the present invention.

FIG. 23 is a main-part enlarged sectional view of an axle bearing device according to yet another embodiment of the present invention. In this embodiment, the elastic portion 151d is mounted to the outer-ring-side sealing portion 151c of the outer-ring-side sealing member 151 so that the seal extended portion 170 is formed. In addition, a projection-recess portion is provided on at least one of the two opposed surfaces of the seal extended portion 170 and the inner ring 120 (in this case, the elastic portion 151d forming the seal extended portion 170), and an axial labyrinth Lb forming the labyrinth seal Ls is formed between the projection-recess portion and the end surface 124 of the inner ring 120. Further, an axial labyrinth La forming the labyrinth seal Ls is formed between inner peripheral surfaces of the outer-ring-side sealing portion 151c and the elastic portion 151d which form the seal extended portion 170 and the outer peripheral surface of the lid member 164.

In FIG. 23, the elastic portion 151d is provided with a projection-recess portion. Alternatively, the end surface 124 of the inner ring 120, which faces the end surface of the elastic portion 151d across the radial labyrinth Lb in the axial direction, may be provided with the projection-recess portion while the end surface of the elastic portion 151d is formed to be flat.

Figure 24:
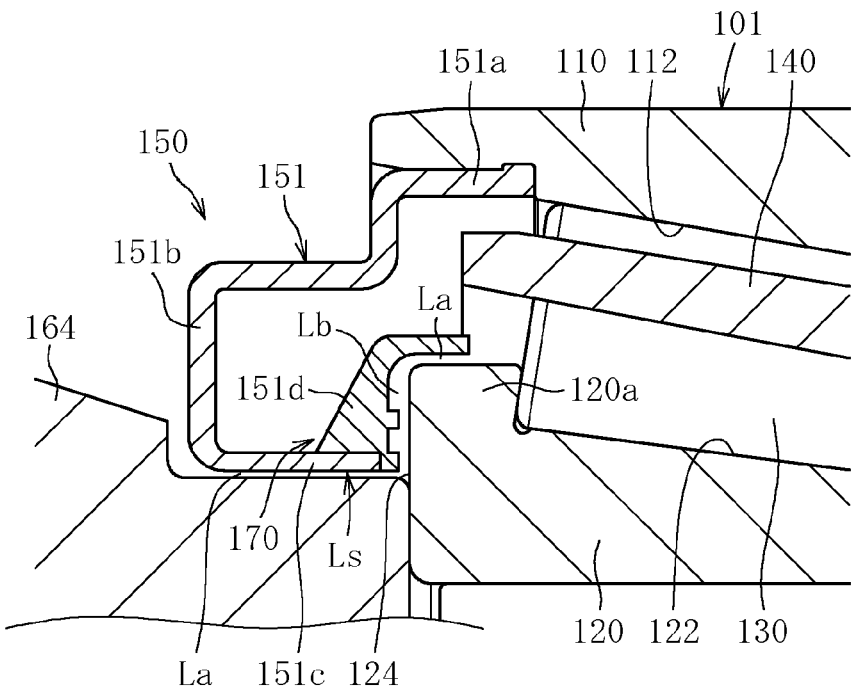
[FIG. 24] A main-part enlarged sectional view of an axle bearing device according to yet another embodiment of the present invention.

FIG. 24 is a main-part enlarged sectional view of an axle bearing device according to yet another embodiment of the present invention. In this embodiment, which is a modification example of the embodiment illustrated in FIG. 23, a cylindrical portion extending in the axial direction toward the bearing internal side is provided at an outer diameter end of the elastic portion 151d forming the seal extended portion 170. In addition, an axial labyrinth La forming the labyrinth seal Ls is additionally provided between two opposed surfaces of this cylindrical portion and the inner ring 120 (flange portion 120a).

Figure 25:
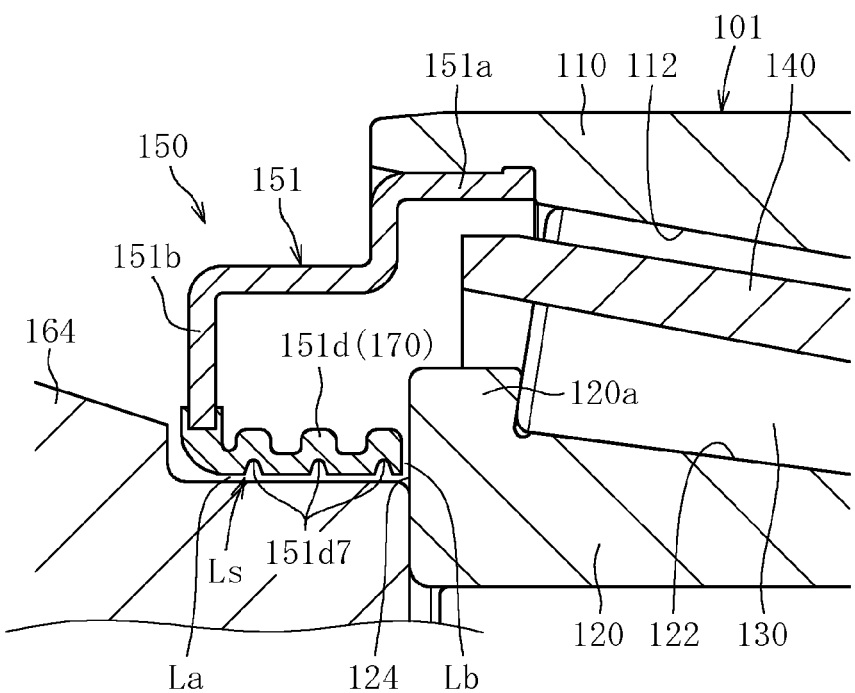
[FIG. 25] A main-part enlarged sectional view of an axle bearing device according to yet another embodiment of the present invention.

FIG. 25 is a main-part enlarged sectional view of an axle bearing device according to yet another embodiment of the present invention. This embodiment illustrates an example in which, of an axial labyrinth La and a radial labyrinth Lb which form the labyrinth seal Ls, at least the radial labyrinth Lb is formed between the seal extended portion 170 and the inner ring 120. In this example, the cylindrical elastic portion 151d is mounted to an inner diameter end of the main body portion 151b of the outer-ring-side sealing member 151 so that the seal extended portion 170 is formed, and the radial labyrinth Lb is formed between the end surface of the seal extended portion 170 and the end surface 124 of the inner ring 120. Further, the axial labyrinth La is formed between the inner peripheral surface of the seal extended portion 170 and the outer peripheral surface of the lid member 164. Circumferential grooves 151d7 are formed at predetermined intervals in the axial direction in the inner peripheral surface of the elastic portion 151d. With this, a projection-recess portion is formed on the inner peripheral surface of the elastic portion 151d. Such a projection-recess portion may be provided on the outer peripheral surface of the lid member 164, which faces the inner peripheral surface of the elastic portion 151d across the axial labyrinth La. The projection-recess portion may be formed as illustrated in FIG. 15, or, for example, may comprise recessed portions and projection portions provided in a dispersed manner.

The present invention is not limited to the embodiment described hereinabove, and various modifications can be made thereto within the scope of the technical concept.

Reference Signs List 1 axle bearing device
2 axle
3 roller bearing
4 inner ring
4b extended portion
5 outer ring
6 tapered roller (rolling element)
8 front lid
9 rear lid
10 sealing device
11 outer-ring-side sealing member
12 first outer-ring-side sealing member
13 second outer-ring-side sealing member
14 first inner-ring-side sealing member
15 second inner-ring-side sealing member
30 intermediate member (branch portion forming member)
31 elastic portion
32 branch portion
40, 41 annular protrusion
Ls labyrinth seal
La1 first axial labyrinth
La2 second axial labyrinth
La3 third axial labyrinth
La4 fourth axial labyrinth
Lb1 first radial labyrinth
Lb2 second radial labyrinth
Lb3 third radial labyrinth
Lb4 fourth radial labyrinth
Lb5 fifth radial labyrinth
101 roller bearing
102 axle
110 outer ring
120 inner ring
124 end surface
130 rolling element
150 sealing device
151 outer-ring-side sealing member
151d elastic portion
152 inner-ring-side sealing member
152d elastic portion
164 lid member (separate member)
170 seal extended portion
La axial labyrinth
Lb radial labyrinth
Ls labyrinth seal

The invention claimed is:

1. An axle bearing device for a railway vehicle, the axle bearing device comprising:
an inner ring to be fixed to an axle of the railway vehicle;
an outer ring to be fixed to a journal box of the railway vehicle; double row rolling elements arranged between raceway surfaces of the inner ring and raceway surfaces of the outer ring;
a lid member arranged on an axial end portion side of the inner ring; and
a branch portion forming member arranged between the inner ring and the lid member, wherein an opening portion between the inner ring and the outer ring is sealed by a labyrinth seal comprising at least one axial labyrinth and at least one radial labyrinth, and wherein at least one of the at least one axial labyrinth and the at least one radial labyrinth which form the labyrinth seal is formed between the inner ring and an outer-ring-side sealing member mounted to the outer ring, or between the outer-ring-side sealing member mounted to the outer ring and an inner-ring-side sealing member mounted to the inner ring, and wherein a branch portion is formed between the lid member and the branch portion forming member, the branch portion extending in a direction different from a direction along which a path of the labyrinth seal extends, and one end of the branch portion in a longitudinal direction opens to the path of the labyrinth seal.

2. An axle bearing device for a railway vehicle according to claim 1, wherein the labyrinth seal comprises at least a first axial labyrinth, a first radial labyrinth, and a second axial labyrinth which are provided continuously with each other in the stated order from a bearing internal side toward a bearing external side, the second axial labyrinth being arranged on an outer diameter side with respect to the first axial labyrinth, the first axial labyrinth being formed between the outer-ring-side sealing member and an extended portion which is provided integrally with the inner ring and extends in an axial direction.

3. An axle bearing device for a railway vehicle according to claim 2, wherein the labyrinth seal further comprises a second radial labyrinth extending from an end portion on the bearing external side of the second axial labyrinth to the outer diameter side.

4. An axle bearing device for a railway vehicle according to claim 3, wherein the labyrinth seal further comprises a third radial labyrinth extending from an end portion on the bearing internal side of the first axial labyrinth to the outer diameter side, the third radial labyrinth being formed between the outer-ring-side sealing member and the inner ring.

5. An axle bearing device for a railway vehicle according to claim 2, wherein an annular protrusion for partially reducing a clearance of the first axial labyrinth is provided on at least one of two opposed surfaces forming the first axial labyrinth.

6. An axle bearing device for a railway vehicle according to claim 2, wherein an annular protrusion for partially reducing a clearance of the second axial labyrinth is provided on at least one of two opposed surfaces forming the second axial labyrinth.

7. An axle bearing device for a railway vehicle according to claim 2,
wherein the labyrinth seal further comprises a second radial labyrinth extending from an end portion on the bearing external side of the second axial labyrinth to the outer diameter side, and
wherein the branch portion is formed of an annular space extending from an inner diameter end portion of the second radial labyrinth to the inner diameter side.

8. An axle bearing device for a railway vehicle according to claim 1,
wherein the branch portion forming member comprises:
an annular portion interposed between an end surface of the inner ring and an end surface of the lid member; and
a cylindrical portion extending in an axial direction from an outer diameter end portion of the annular portion along an outer surface of the lid member, and
wherein the lid member is fastened to the axle through intermediation of an elastic portion made of an elastic material and interposed under a compressed state between the outer surface of the lid member and an inner surface of the cylindrical portion.

9. An axle bearing device for a railway vehicle according to claim 8, wherein the branch portion forming member further comprises a small diameter cylindrical portion extending in an axial direction from an inner diameter end portion of the annular portion, the small diameter cylindrical portion being fitted to an inner surface of the inner ring.

10. An axle bearing device for a railway vehicle according to claim 1, wherein the outer-ring-side sealing member comprises a seal extended portion extending toward an end surface of the inner ring, the seal extended portion forming the labyrinth seal.

11. An axle bearing device for a railway vehicle according to claim 10, wherein, of the at least one axial labyrinth and the at least one radial labyrinth which form the labyrinth seal, at least the at least one axial labyrinth is formed between the seal extended portion and the inner-ring-side sealing member mounted to the inner ring.

12. An axle bearing device for a railway vehicle according to claim 10, wherein, of the at least one axial labyrinth and the at least one radial labyrinth which form the labyrinth seal, at least the at least one radial labyrinth is formed between the seal extended portion and the inner ring.

13. An axle bearing device for a railway vehicle according to claim 10, wherein, of the at least one axial labyrinth and the at least one radial labyrinth which form the labyrinth seal, at least the at least one axial labyrinth is formed between the seal extended portion and a separate member mounted to the axle of the railway vehicle on a shaft end side with respect to the inner ring.

* * * * *